US008516182B2

(12) United States Patent
Yoshii et al.

(10) Patent No.: US 8,516,182 B2
(45) Date of Patent: Aug. 20, 2013

(54) CONTROLLER AND MEMORY SYSTEM FOR MANAGING DATA

(75) Inventors: Kenichiro Yoshii, Tokyo (JP); Shinichi Kanno, Tokyo (JP); Shigehiro Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 913 days.

(21) Appl. No.: 12/554,272

(22) Filed: Sep. 4, 2009

(65) Prior Publication Data

US 2010/0241819 A1    Sep. 23, 2010

(30) Foreign Application Priority Data

Mar. 17, 2009  (JP) ................................. 2009-065144

(51) Int. Cl.
*G06F 12/10* (2006.01)
(52) U.S. Cl.
USPC ...... 711/103; 711/206; 711/221; 711/E12.059
(58) Field of Classification Search
None
See application file for complete search history.

(56) References Cited

U.S. PATENT DOCUMENTS

| | | | | |
|---|---|---|---|---|
| 6,779,099 | B2 * | 8/2004 | Hou | 711/170 |
| 7,953,920 | B2 * | 5/2011 | Yano et al. | 711/103 |
| 7,962,688 | B2 * | 6/2011 | Yano et al. | 711/103 |
| 8,065,470 | B2 * | 11/2011 | Yano et al. | 711/103 |
| 8,065,471 | B2 * | 11/2011 | Yano et al. | 711/103 |
| 2005/0135180 | A1 * | 6/2005 | Roohparvar | 365/230.06 |
| 2006/0288153 | A1 * | 12/2006 | Tanaka et al. | 711/103 |
| 2010/0241819 | A1 * | 9/2010 | Yoshii et al. | 711/170 |
| 2011/0060863 | A1 * | 3/2011 | Kimura et al. | 711/103 |

FOREIGN PATENT DOCUMENTS

| | | |
|---|---|---|
| EP | 1 739 565 A1 | 1/2007 |
| JP | 7-219720 A | 8/1995 |
| JP | 11-143764 A | 5/1999 |
| JP | 2002-175211 A | 6/2002 |
| JP | 2006-40264 A | 2/2006 |
| JP | 2006-216036 | 8/2006 |

OTHER PUBLICATIONS

Extended European Search Report issued Jul. 6, 2010 in Patent Application No. 09169474.5.
Japanese Office Action Issued Feb. 19, 2013 in Patent Application No. 2009-065144 (with English translation).

* cited by examiner

*Primary Examiner* — Reginald Bragdon
*Assistant Examiner* — Eric Loonan
(74) *Attorney, Agent, or Firm* — Oblon, Spivak, McClelland, Maier & Neustadt, L.L.P.

(57) ABSTRACT

A controller includes a storage for a translation table showing logical and physical addresses in a flash memory in correspondence with one another; another storage storing FAT information indicating the state of data stored in each of pages contained in each of blocks and FAT information identifiers each identifying a block to which pages each storing therein the data in the state indicated by the FAT information belong, while keeping them in correspondence with one another; yet another storage for a block management table showing block identifiers, use-state judging information indicating whether the corresponding block is used/unused, and the FAT information identifiers corresponding to all the blocks indicated as being used by the use-state judging information, while keeping them in correspondence with one another; and a controller controlling unit managing data stored in the flash memory by using the translation table, the FAT information, and the block management table.

9 Claims, 21 Drawing Sheets

FIG.2

| LOGICAL ADDRESS | PHYSICAL ADDRESS |
|---|---|
| L0 | B0 |
| L1 | B1 |
| L2 | B2 |
| L3 | A3 |
| L4 | A4 |
| L5 | B3 |
| L6 | B5 |
| L7 | B4 |
| L8 | B6 |
| L9 | A9 |

FIG.3

| FAT INFORMATION IDENTIFIER | ... | 10 | ... | 21 | ... |
|---|---|---|---|---|---|
| FAT INFORMATION | ... | IV | ... | V | ... |
| | | IV | | V | |
| | | IV | | V | |
| | | V | | V | |
| | | V | | V | |
| | | IV | | V | |
| | | IV | | V | |
| | | IV | | N/A | |
| | | IV | | N/A | |
| | | V | | N/A | |

N/A: UNWRITTEN
IV: INVALID
V: VALID
D: DELETED

FIG.4

| BLOCK IDENTIFIER | USE-STATE JUDGING INFORMATION | FAT INFORMATION IDENTIFIER |
|---|---|---|
| ⋮ | ⋮ | ⋮ |
| A | USED | 10 |
| ⋮ | ⋮ | ⋮ |
| B | USED | 21 |
| ⋮ | ⋮ | ⋮ |

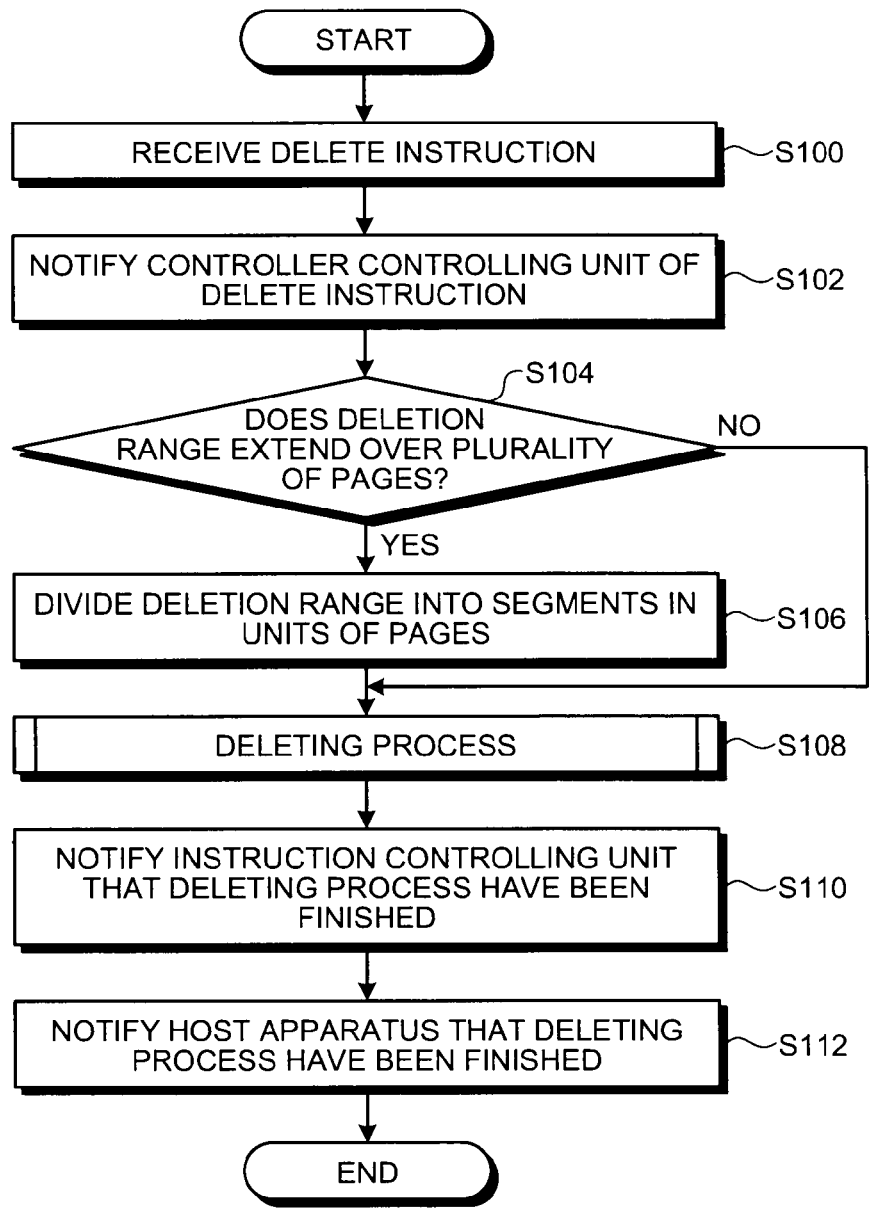

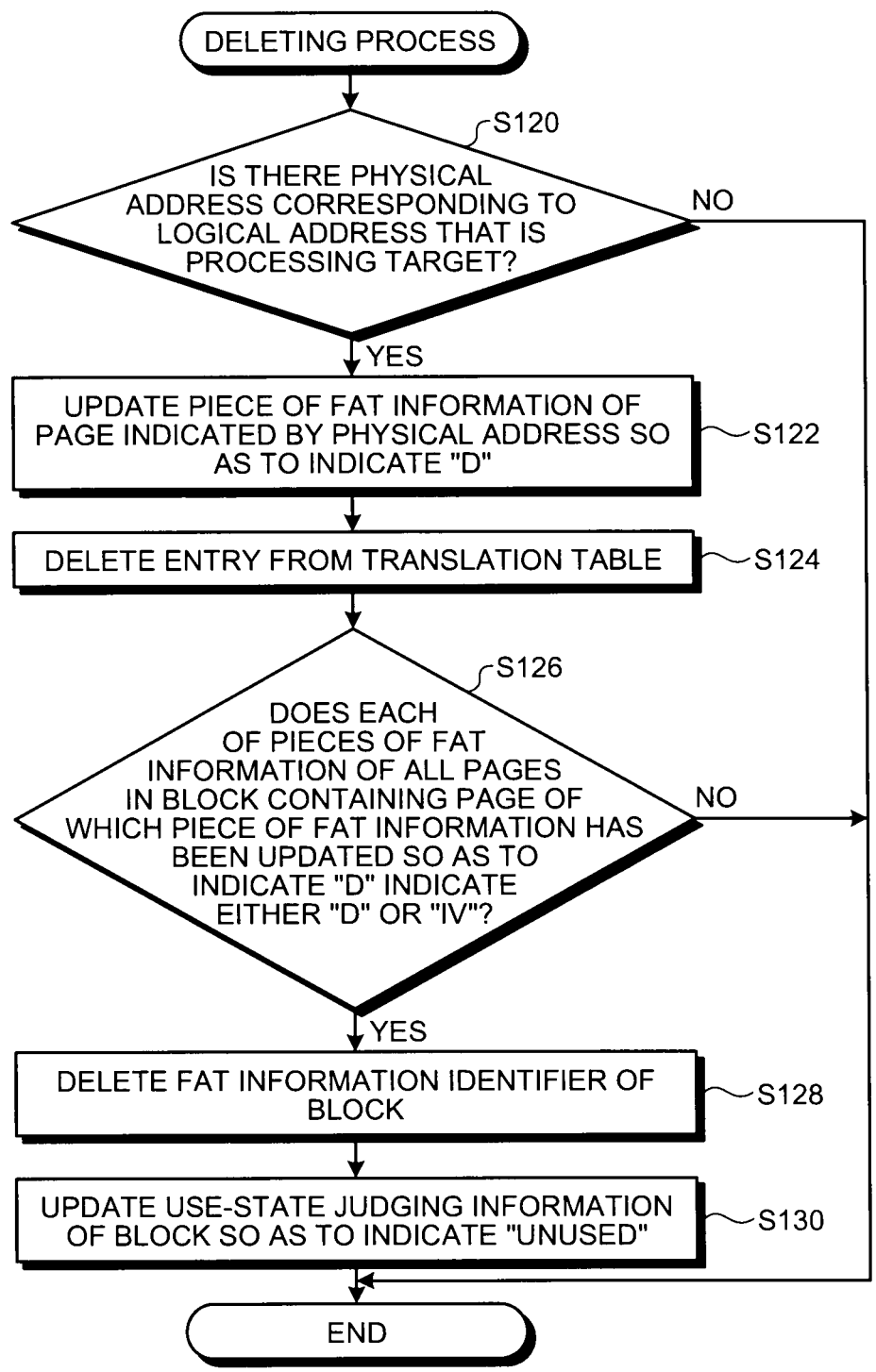

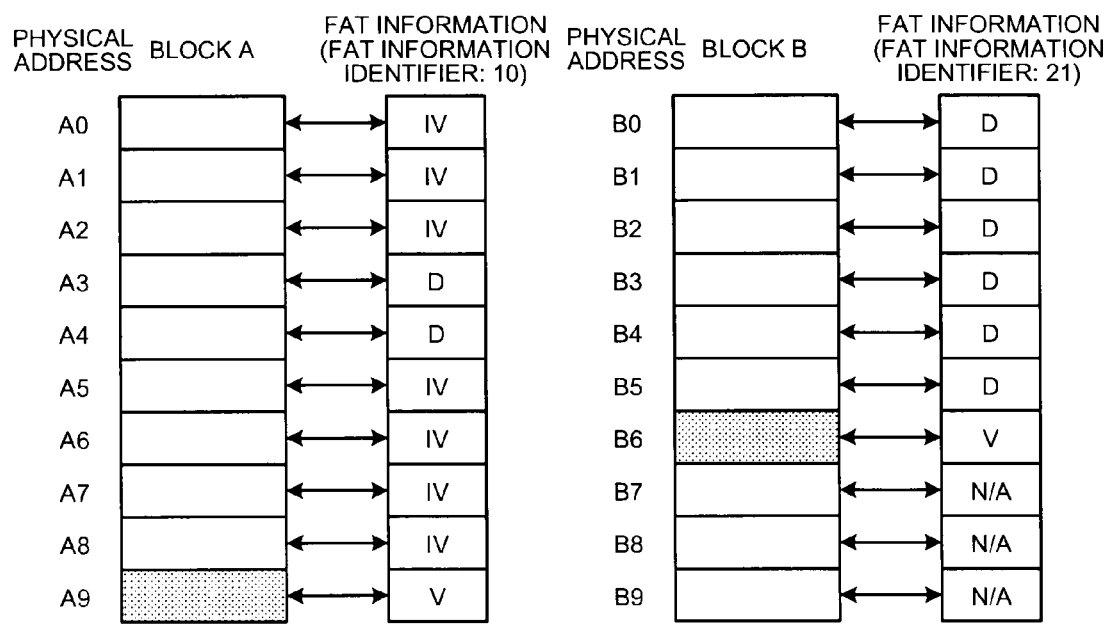

| BLOCK IDENTIFIER | USE-STATE JUDGING INFORMATION | FAT INFORMATION IDENTIFIER |
|---|---|---|
| ⋮ | UNUSED | ⋮ |
| A | USED | 10 |
| ⋮ | UNUSED | ⋮ |
| B | UNUSED | ⋮ |
| ⋮ | UNUSED | ⋮ |

| LOGICAL ADDRESS | PHYSICAL ADDRESS |
|---|---|
| L9 | A9 |

| BLOCK IDENTIFIER | USE-STATE JUDGING INFORMATION | FAT INFORMATION IDENTIFIER |
|---|---|---|
| ⋮ | ⋮ | ⋮ |
| A | USED | 10 |
| ⋮ | ⋮ | ⋮ |

FIG.22

| LOGICAL ADDRESS | PHYSICAL ADDRESS |
|---|---|
| L0 | A0 |
| L1 | A1 |
| L2 | A2 |
| L3 | A3 |
| L4 | A4 |
| L5 | A5 |
| L6 | A6 |
| L7 | A7 |
| L8 | A8 |
| L9 | A9 |

FIG.23

| BLOCK IDENTIFIER | USE-STATE JUDGING INFORMATION | FAT INFORMATION IDENTIFIER |
|---|---|---|
| ⋮ | ⋮ | ⋮ |
| A | USED | 10 |
| ⋮ | ⋮ | ⋮ |
| B | USED | 21 |
| ⋮ | ⋮ | ⋮ |

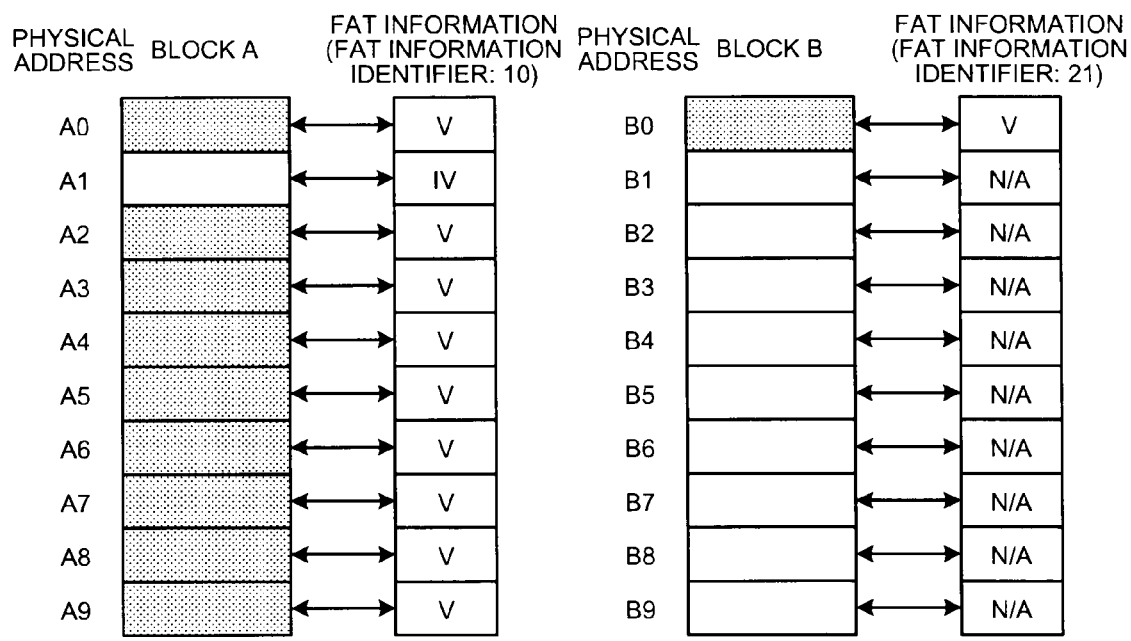

| LOGICAL ADDRESS | PHYSICAL ADDRESS |
|---|---|
| L3 | A3 |
| L4 | A4 |
| L9 | A9 | ated with one another, each of the logical addresses indicating a virtual position in an area
CONTROLLER AND MEMORY SYSTEM FOR MANAGING DATA

CROSS-REFERENCE TO RELATED APPLICATIONS

This application is based upon and claims the benefit of priority from the prior Japanese Patent Application No. 2009-065144, filed on Mar. 17, 2009; the entire contents of which are incorporated herein by reference.

BACKGROUND OF THE INVENTION

1. Field of the Invention

The present invention relates to a controller and a memory system.

2. Description of the Related Art

Memory systems (e.g., Solid State Disks [SSDs]) each of which includes a large number of flash memories and a memory controller that manages data stored in the flash memories have conventionally been known.

In such a memory system, the memory controller refers to a translation table in which logical addresses and physical addresses in the flash memories are kept in correspondence with one another and searches for a physical address that corresponds to a logical address notified by a host apparatus such as a personal computer (PC). According to the contents of an instruction that has been received from the host apparatus together with the logical address, the memory controller writes data into, reads data from, or deletes data from, an area in the flash memories indicated by the physical address that has been found in the search.

The data stored in the flash memories is processed in units of: "pages" each of which is normally an area itself that is indicated by a physical address and is the smallest processing unit; and "blocks" each of which is a processing unit containing a plurality of pages.

Unlike Hard Disk Drives (HDDs) and the like, flash memories have characteristics as follows: it is not possible to write a new piece of data into an area in which another piece of data has already been written, unless the written piece of data is erased first; it is possible to erase the data only in units of blocks; and when the data erasing process is repeatedly performed, physical deterioration of the flash memories occurs.

For this reason, in the memory systems as described above, the memory controller manages information (hereinafter, "File Allocation Table [FAT] information") indicating whether the data stored in the pages is valid, invalid, or deleted (see, for example, JP-A 2006-216036 (KOKAI)). The memory controller also realizes deletions and overwriting of the data by, for example, rewriting the FAT information, so that it is possible to avoid the situation in which, every time a delete instruction or an overwrite instruction is issued by the host apparatus, the data is actually erased from the flash memories in units of blocks.

For example, in a data overwriting process, the memory controller writes a new piece of data used for overwriting an old piece of data into a page that is different from the page in which the old piece of data is stored. The memory controller then updates a piece of FAT information of the page in which the old piece of data is stored so as to be invalid, and also updates the correspondence relationship between the logical addresses and the physical addresses.

Next, the correspondence relationships between blocks and pieces of FAT information before and after a data overwriting process is performed in a conventional memory system as described in, for example, JP-A 2006-216036 (KOKAI) will be explained, with reference to FIGS. 29 and 30.

FIG. 29 is a schematic drawing for explaining the state of the blocks and the pieces of FAT information before a data overwriting process is performed in a conventional memory system as described in, for example, JP-A 2006-216036 (KOKAI). In the example shown in FIG. 29, a state in which data is stored in each of all the pages in a block X is shown. Each of the pieces of FAT information of these pages indicates "V", which means "valid".

FIG. 30 is a schematic drawing for explaining the state of the blocks and the pieces of FAT information after a data overwriting process is performed in a conventional memory system as described in, for example, JP-A 2006-216036 (KOKAI). In the example shown in FIG. 30, a state is shown in which a new piece of data used for overwriting a piece of data stored in a page 901 in the block X has been written in a page 902 in a block Y. The piece of FAT information of the page 901 has been updated so as to indicate "IV", which means "invalid".

In the state shown in FIG. 30, the correspondence relationships between the logical addresses and the physical addresses are updated in the translation table. The logical address corresponding to a physical address X7 indicating the page 901 is brought into correspondence with a physical address Y1 indicating the page 901 (not shown).

However, in the conventional memory system as described above, no FAT information is managed for the pages in the block (e.g., the block Y in the example shown in FIG. 30; and a log block in the example shown in JP-A 2006-216036 (KOKAI)) that is to store therein the data to be written during a data overwriting process or the like.

As a result, for such blocks of which no FAT information is managed, it is not possible to manage the state of the data stored in the pages contained in each of those blocks. Thus, in some cases, storage areas in the flash memories are not effectively utilized.

For example, in the state shown in FIG. 30, even if a delete instruction for the page 902 has been issued, it is not possible for the memory system to remember that the data stored in the page 902 is deleted data, because there is no FAT information.

For this reason, the data can actually be deleted only in the case where an instruction instructing that the data stored in the pages of a block should all be deleted has been received from the host apparatus. In other words, when there is a block in which none of the pages store therein valid data, it is not possible to erase the data immediately so as to bring the block back into a state where a new piece of data can be written thereto. Thus, there is a possibility that the number of writable blocks may needlessly decrease and that fragmentation may occur in the flash memories.

SUMMARY OF THE INVENTION

According to one aspect of the present invention, a controller includes a translation table storage unit that stores a translation table in which logical addresses and physical addresses are kept in correspondence with one another, each of the logical addresses indicating a virtual position in an area in a flash memory, and each of the physical addresses indicating a physical position in the area in the flash memory in units of pages; a FAT information storage unit that stores pieces of File Allocation Table (FAT) information and FAT information identifiers that are kept in correspondence with one another, each of the pieces of FAT information indicating a state of data stored in a corresponding one of pages contained in one of blocks which are areas corresponding to a plurality of pages, and each of the FAT information identifiers identifying a different one of the blocks to which the pages each storing the data in the state indicated by a corresponding one of the pieces of FAT information belong; a block management-table storage unit that stores a block management table in which block identifiers, pieces of use-state judging information, and the FAT information identifiers are kept in correspondence with one another, each of the block identifiers identifying a different one of the blocks, each of the pieces of use-state judging information indicating whether a corresponding one of the blocks is "used" or "unused", and the FAT information identifiers being respectively kept in correspondence with all of such blocks that are each indicated as being "used" by a corresponding one of the pieces of use-state judging information; and a controller controlling unit that manages data stored in the flash memory by using the translation table, the pieces of FAT information, and the block management table.

According to another aspect of the present invention, a memory system includes a controller that includes a translation table storage unit that stores a translation table in which logical addresses and physical addresses are kept in correspondence with one another, each of the logical addresses indicating a virtual position in an area in a flash memory, and each of the physical addresses indicating a physical position in the area in the flash memory in units of pages, a FAT information storage unit that stores pieces of File Allocation Table (FAT) information and FAT information identifiers that are kept in correspondence with one another, each of the pieces of FAT information indicating a state of data stored in a corresponding one of pages contained in one of blocks which are areas corresponding to a plurality of pages, and each of the FAT information identifiers identifying a different one of the blocks to which the pages each storing the data in the state indicated by a corresponding one of the pieces of FAT information belong, a block management-table storage unit that stores a block management table in which block identifiers, pieces of use-state judging information, and the FAT information identifiers are kept in correspondence with one another, each of the block identifiers identifying a different one of the blocks, each of the pieces of use-state judging information indicating whether a corresponding one of the blocks is "used" or "unused", and the FAT information identifiers being respectively kept in correspondence with all of such blocks that are each indicated as being "used" by a corresponding one of the pieces of use-state judging information, and a controller controlling unit that manages data stored in the flash memory by using the translation table, the pieces of FAT information, and the block management table; and a flash memory that stores data that is managed by the controller.

BRIEF DESCRIPTION OF THE DRAWINGS

FIG. 2 is a drawing illustrating an example of a translation table;
FIG. 3 is a drawing illustrating an example of pieces of FAT information;
FIG. 4 is a drawing illustrating an example of a block management table;
FIG. 5 is an example of a flowchart of a deleting operation performed in the memory system according to the first embodiment;
FIG. 6 is a drawing illustrating an example of the contents of a delete instruction;
FIG. 7 is an example of a flowchart of a deleting process according to the first embodiment;
FIG. 9 is a drawing illustrating an example of pieces of data in blocks after deleting processes have been finished;
FIG. 10 is a drawing illustrating an example of the translation table obtained after the deleting processes have been finished;
FIG. 22 is a drawing illustrating an example of the translation table obtained after the writing process has been finished;
FIG. 23 is a drawing illustrating an example of the block management table obtained after another writing process has been finished;
FIG. 24 is a drawing illustrating an example of pieces of data in blocks after said another writing process has been finished;
FIG. 25 is a drawing illustrating an example of the translation table obtained after said another writing process has been finished.

DETAILED DESCRIPTION OF THE INVENTION

Exemplary embodiments of a controller and a memory system according to the present invention will be explained in detail, with reference to the accompanying drawings. In the description of the exemplary embodiments below, a Solid State Disk (SSD) will be used as an example of a memory system in the explanation; however, the present invention is not limited to this example.

First, a configuration of a memory system according to a first embodiment of the present invention will be explained.

Figure 1:
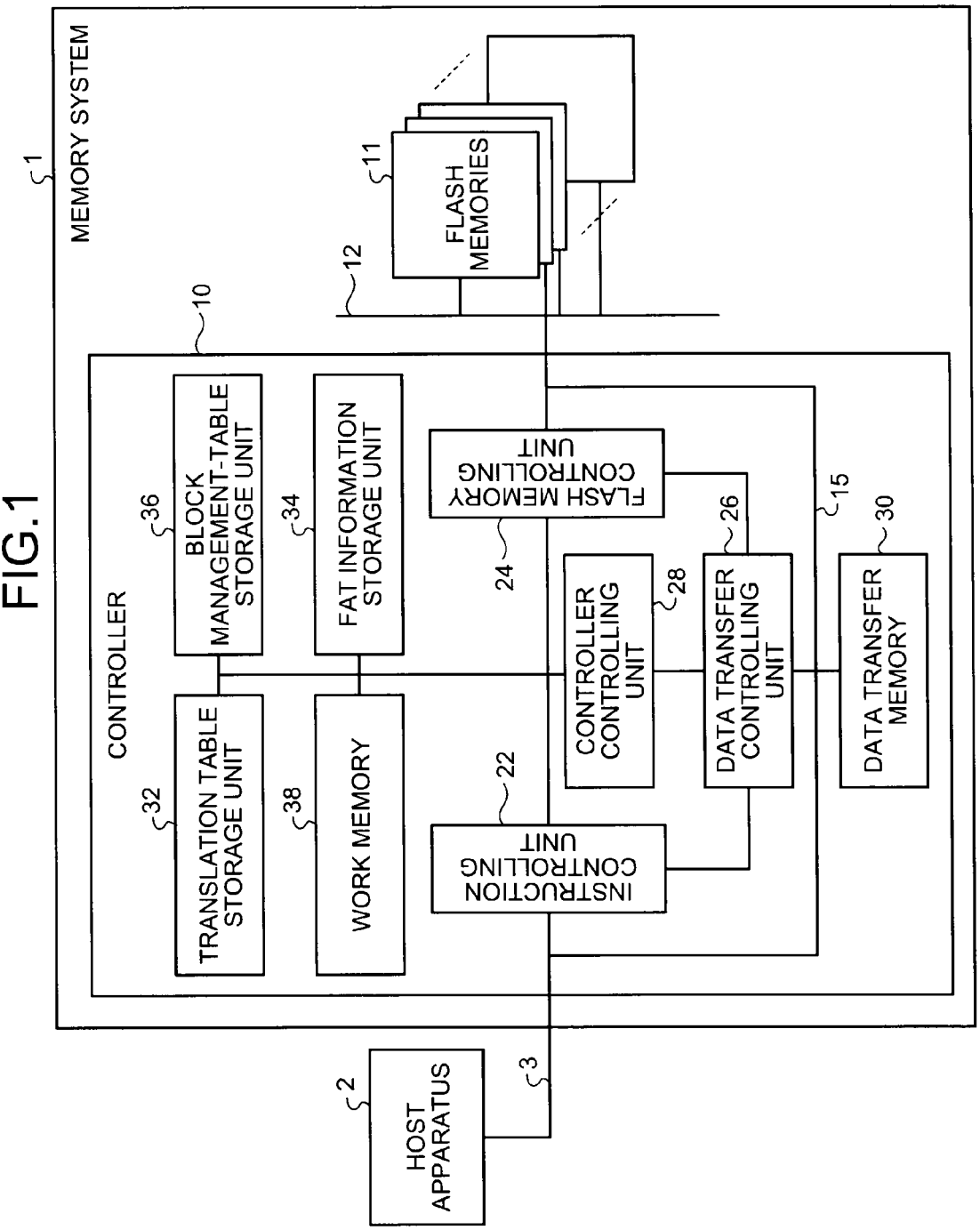
FIG. 1 is a block diagram of a memory system according to a first embodiment of the present invention.

FIG. 1 is an exemplary block diagram of a memory system 1 according to the first embodiment.

The memory system 1 is connected to a host apparatus 2 that is, for example, a personal computer (PC), via an external bus 3. The memory system 1 includes a controller 10 and a plurality of flash memories 11. The controller 10 is connected to the plurality of flash memories 11 via a dedicated bus 12. Also, the host apparatus 2 is connected to the plurality of flash memories 11 via the external bus 3, a data bus 15 provided inside the controller 10, and the dedicated bus 12.

The controller 10 receives various types of instructions (i.e., commands) from the host apparatus 2 and performs various types of processes on the flash memories 11. The controller 10 includes: an instruction controlling unit 22; a flash memory controlling unit 24; a data transfer controlling unit 26; a controller controlling unit 28; a data transfer memory 30; a translation table storage unit 32; a FAT information storage unit 34; a block management-table storage unit 36; and a work memory 38.

The instruction controlling unit 22 is connected to the host apparatus 2 via the external bus 3. The instruction controlling unit 22 receives various types of instructions such as a read instruction, a write instruction, and a delete instruction issued by the host apparatus 2 and returns a response to the host apparatus 2.

The flash memory controlling unit 24 is connected to the plurality of flash memories 11 via the dedicated bus 12. According to each of the instructions that have been received by the instruction controlling unit 22, the flash memory controlling unit 24 deletes data from, reads data from, or writes data into, the flash memories 11.

The data transfer controlling unit 26 is connected to the data bus 15 and transfers data between the host apparatus 2 and the flash memories 11. More specifically, as being instructed by the instruction controlling unit 22 or the flash memory controlling unit 24, the data transfer controlling unit 26 transfers data stored in the data transfer memory 30 connected to the data bus 15, to the host apparatus 2 or to the flash memories 11. The data transfer controlling unit 26 may be realized by using, for example, a Direct Memory Access Controller (DMAC).

The data transfer memory 30 is configured so as to temporarily store therein data to be transferred until the data transfer controlling unit 26 performs a data transfer process. More specifically, the data transfer memory 30 temporarily stores therein the data that is written from the host apparatus 2 or the data that is read from the flash memories 11. The data transfer memory 30 may be realized by using, for example, a volatile Random Access Memory (RAM).

According to the first embodiment, the data transfer memory 30 stores therein both the data for the instruction controlling unit 22 and the data for the flash memory controlling unit 24. However, another arrangement is acceptable in which the memory system 1 separately includes a data transfer memory that stores therein the data for the instruction controlling unit 22 and another data transfer memory that stores therein the data for the flash memory controlling unit 24.

The translation table storage unit 32 stores therein a translation table in which logical addresses and physical addresses are kept in correspondence with one another. Each of the logical addresses indicates a virtual position in an area in the flash memories 11, whereas each of the physical addresses indicates a physical position in an area in the flash memories 11 in units of pages.

FIG. 2 is a drawing illustrating an example of the translation table. In the example shown in FIG. 2, for instance, a logical address L0 and a physical address B0 are kept in correspondence with each other; however, this correspondence relationship is not fixed. When a deleting process to delete data from the flash memories 11 or a writing process to write data into the flash memories 11 has been performed, the controller controlling unit 28 (explained later) updates the correspondence relationship.

The FAT information storage unit 34 stores therein pieces of File Allocation Table (FAT) information and FAT information identifiers, while keeping them in correspondence with one another. Each of the pieces of FAT information indicates the state of the data stored in a corresponding one of a plurality of pages contained in one of the blocks which are areas corresponding to a plurality of pages, whereas each of the FAT information identifiers identifies a different one of the blocks to which the pages each storing therein the data in the state indicated by a corresponding one of the pieces of FAT information belong.

FIG. 3 is a drawing illustrating an example of the pieces of FAT information stored in the FAT information storage unit 34. In the example shown in FIG. 3, one block is an area corresponding to ten pages. The pieces of FAT information of the pages are managed in units of blocks and are kept in correspondence with the FAT information identifiers. As for each of the pieces of FAT information, "N/A" denotes "unwritten", "IV" denotes "invalid", and "V" denotes "valid". Also, "D" denotes "deleted", although none of the pieces of FAT information in the example shown in FIG. 3 indicates "deleted".

The block management-table storage unit 36 stores therein a block management table in which block identifiers, pieces of use-state judging information, and FAT information identifiers are kept in correspondence with one another. Each of the block identifiers identifies a different one of the blocks, whereas each of the pieces of use-state judging information indicates whether a corresponding one of the blocks is used or unused, while the FAT information identifiers are respectively kept in correspondence with all of such blocks that are each indicated as being "used" by a corresponding one of the pieces of use-state judging information.

FIG. 4 is a drawing illustrating an example of the block management table. In the example shown in FIG. 4, the blocks identified with a block identifier A and a block identifier B are each indicated as being "used" by the piece of use-state judging information and are respectively kept in correspondence with FAT information identifiers. With this arrangement, it is possible to refer to each of the pieces of FAT information that are kept in correspondence with the FAT information identifiers in the FAT information storage unit 34 and to determine the state of the data in each of the pages contained in any of the blocks.

The controller controlling unit 28 controls operations of the instruction controlling unit 22, the flash memory controlling unit 24, and the data transfer controlling unit 26. The controller controlling unit 28 controls the data transfer between the host apparatus 2 and the flash memories 11 by controlling the operations of these controlling units.

Also, the controller controlling unit 28 manages the data stored in the plurality of flash memories 11 by using the translation table, the FAT information, and the block management table. More specifically, according to the contents of each of instructions issued by the host apparatus 2, the controller controlling unit 28 manages the data stored in the plurality of flash memories 11 by updating the translation table, the FAT information, and the block management table.

The translation table storage unit 32, the FAT information storage unit 34, and the block management-table storage unit 36 may each be realized by using, for example, a memory.

The work memory 38 is used as a working area for various types of processes performed by the controller controlling unit 28. The translation table, the FAT information, the block management table, and the like are loaded into the work memory 38. The work memory 38 may be realized by using, for example, a volatile Random Access Memory (RAM). Another arrangement is acceptable in which the work memory 38 also serves as at least one selected out of: the translation table storage unit 32, the FAT information storage unit 34, and the block management-table storage unit 36.

Next, a deleting operation performed in the memory system according to the first embodiment will be explained.

FIG. 5 is a flowchart of an example of procedures in the deleting operation performed in the memory system 1 according to the first embodiment.

First, the instruction controlling unit 22 receives a delete instruction issued by the host apparatus 2 (step S100). The delete instruction contains a logical address indicating the head of an area in the flash memories 11 from which the data is to be deleted and information indicating the size of the data to be deleted, in addition to information indicating that the type of the instruction is a deletion. FIG. 6 is a drawing illustrating an example of the contents of a delete instruction. In the example shown in FIG. 6, it is indicated that the contents of the instruction is a deletion, whereas the head logical address is L0, while the size of the data to be deleted is 256 kilobytes (KB).

Subsequently, the instruction controlling unit 22 notifies the controller controlling unit 28 of the received delete instruction (step S102). The instruction controlling unit 22 notifies the controller controlling unit 28 of the received delete instruction after examining the delete instruction by, for example, checking to see if the head logical address actually exists and if the size is proper. In the case where the delete instruction is examined by the controller controlling unit 28, the instruction controlling unit 22 forwards the received delete instruction to the controller controlling unit 28 without examining the received delete instruction.

After that, by referring to the size indicated in the delete instruction, the controller controlling unit 28 checks to see if the deletion range extends over a plurality of pages (i.e., a plurality of physical addresses) in the flash memories (step S104).

In the case where the deletion range extends over a plurality of pages (step S104: Yes), the controller controlling unit 28 divides the received delete instruction into delete instructions in units of pages so that the deletion range is divided into segments in units of pages (step S106). Conversely, in the case where the deletion range does not extend over a plurality of pages (step S104: No), the controller controlling unit 28 does not perform the process at step S106.

Subsequently, the controller controlling unit 28 performs a deleting process according to the one or more delete instructions (step S108). In the case where the delete instruction has been divided into a number of delete instructions, the controller controlling unit 28 performs deleting processes corresponding to the number of delete instructions. In other words, the controller controlling unit 28 performs a deleting process for each of the pages in the deletion range. The details of the deleting processes will be explained later.

After that, when having finished all the deleting processes, the controller controlling unit 28 notifies the instruction controlling unit 22 that the deleting processes have been finished (step S110).

Subsequently, the instruction controlling unit 22 notifies the host apparatus 2 that the deleting processes based on the received delete instruction have been finished (step S112).

Upon this notification, the deleting operation performed in the memory system 1 has been completed. The host apparatus 2 is thus able to send the next instruction to the memory system 1.

FIG. 7 is a flowchart of an example of procedures in the deleting process performed at step S108 shown in FIG. 5.

First, the controller controlling unit 28 refers to the translation table and checks to see if there is a physical address corresponding to the logical address that is the processing target (step S120). In the case where there is no physical address corresponding to the logical address that is the processing target (step S120: No), the process is ended.

Subsequently, in the case where there is a physical address corresponding to the logical address that is the processing target (step S120: Yes), the controller controlling unit 28 refers to the block management table and searches the FAT information storage unit 34 for a piece of FAT information of the page indicated by the physical address. The controller controlling unit 28 then updates the piece of FAT information found in the search so as to indicate "D", which means "deleted" (step S122).

After that, the controller controlling unit 28 deletes an entry from the translation table, the entry showing the correspondence relationship between the logical address that is the processing target and the physical address (step S124).

Subsequently, the controller controlling unit 28 scans the pieces of FAT information of all the pages in the block containing the page of which the piece of FAT information has been updated so as to indicate "D" and checks to see if each of the pieces of FAT information of all the pages indicates either "D", which means "deleted", or "IV", which means "invalid" (step S126). In the case where at least one of the pieces of FAT information corresponding to all the pages indicates other than "D" or "IV" (step S126: No), the process is ended.

On the contrary, in the case where each of the pieces of FAT information of all the pages indicates either "D" or "IV" (step S126: Yes), the controller controlling unit 28 deletes the FAT information identifier corresponding to the block identifier of the block from the block management table (step S128).

After that, the controller controlling unit 28 brings the block into an unused state by updating the block management table so that the piece of use-state judging information corresponding to the block identifier of the block indicates "unused" (step S130).

Next, a specific example of the deleting operation performed in the memory system according to the first embodiment will be explained.

Figure 8:
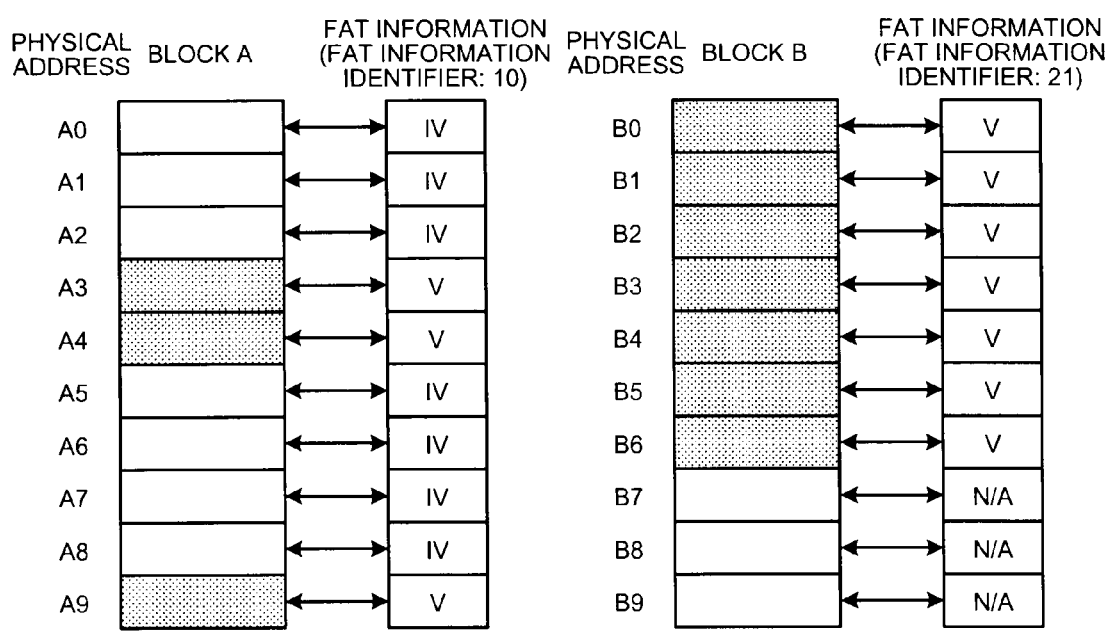
FIG. 8 is a drawing illustrating an example of a state of pieces of data stored in pages.

FIG. 8 is an exemplary schematic drawing illustrating the state of the pieces of data stored in the pages contained in blocks. In the example shown in FIG. 8, blocks A and B as well as physical addresses indicating the pages contained in each of the blocks and pieces of FAT information of the pages are shown. A translation table, FAT information, and a block management table that correspond to the state shown in FIG. 8 are shown in FIGS. 2, 3, and 4, respectively.

In the following sections, an operation of the memory system 1 that is performed when, in the state shown in FIG. 8, a delete instruction for the logical addresses L0 to L7 has been received from the host apparatus 2 will be explained, with reference to the flowcharts in FIGS. 5 and 7.

First, the instruction controlling unit 22 receives the delete instruction issued by the host apparatus 2 and notifies the controller controlling unit 28 of the received delete instruction (steps S100 and S102 in FIG. 5).

Subsequently, because the deletion range is at the logical addresses L0 to L7, the controller controlling unit 28 confirms that the deletion range extends over eight pages (i.e., a plurality of physical addresses) in the flash memories and thus divides the delete instruction into delete instructions that respectively correspond to the eight pages (i.e., the delete instructions each of which corresponds to a different one of the logical addresses L0 to L7) (steps S104 and S106 in FIG. 5).

Accordingly, the controller controlling unit 28 performs the deleting processes corresponding to the eight pages (step S108 in FIG. 5).

After that, the controller controlling unit 28 first refers to the translation table shown in FIG. 2 and confirms that there is a physical address B0 that corresponds to the logical address L0 that is the processing target (step S120 in FIG. 7).

Subsequently, the controller controlling unit 28 refers to the block management table shown in FIG. 4 and searches for a FAT information identifier 21 that corresponds to a block identifier B identifying the block B that contains the page indicated by the physical address B0. After that, the controller controlling unit 28 further searches for a piece of FAT information of the page indicated by the physical address B0, out of the pieces of FAT information of the pages corresponding to the FAT information identifier 21. The controller controlling unit 28 then updates the piece of FAT information found in the search so as to indicate "D" (step S122 in FIG. 7).

Subsequently, the controller controlling unit 28 deletes an entry from the translation table shown in FIG. 2, the entry showing the correspondence relationship between the physical address B0 and the logical address L0 (step S124 in FIG. 7).

After that, the controller controlling unit 28 scans the pieces of FAT information of all the pages in the block B (i.e., all the pieces of FAT information that correspond to the FAT information identifier 21). However, because at least one of the pieces of FAT information corresponding to all the pages indicates other than "D" or "IV", the process performed on the logical address L0 is ended at this point (step S126 in FIG. 7).

It should be noted, however, that the logical addresses L1 to L7 have not yet been processed, and the deletion range has not completely been processed. Thus, the controller controlling unit 28 repeatedly performs the deleting process described here (i.e., steps S120 to S126 in FIG. 7) for each of the logical addresses L1 to L7. The explanation of the deleting processes performed on the logical addresses L1 to L7 will be omitted.

Subsequently, when having finished all the deleting processes, the controller controlling unit 28 notifies the instruction controlling unit 22 that the deleting processes have been finished. The instruction controlling unit 22 notifies the host apparatus 2 that the deleting processes based on the received delete instruction has been finished (steps S110 and S112 in FIG. 5).

FIG. 9 is a schematic drawing illustrating the state of the pieces of data stored in the pages contained in the blocks, after the deleting processes on the logical addresses L0 to L7 have been finished. FIG. 10 is a drawing illustrating the state of the translation table obtained after the deleting processes on the logical addresses L0 to L7 have been finished.

As shown in FIG. 9, in the blocks after the deleting processes on the logical addresses L0 to L7 have been finished, each of the pieces of FAT information of the pages indicated by the physical addresses B0, B1, B2, A3, A4, B3, B5, and B4 that respectively correspond to the logical addresses L0 to L7 indicates "D". Also, as shown in FIG. 10, in the translation table obtained after the deleting processes on the logical addresses L0 to L7 have been finished, all entries that show the correspondence relationships between the logical addresses L0 to L7 and the physical addresses B0, B1, B2, A3, A4, B3, B5, and B4 have been deleted.

Next, a deleting operation of the memory system 1 that is performed when, in the state shown in FIG. 9, a delete instruction for the logical address L8 has further been received from the host apparatus 2 will be explained, with reference to the flowcharts in FIGS. 5 and 7.

First, the instruction controlling unit 22 receives the delete instruction issued by the host apparatus 2 and notifies the controller controlling unit 28 of the received delete instruction (steps S100 and S102 in FIG. 5).

Subsequently, because the deletion range is only at the logical address L8, the controller controlling unit 28 confirms that the deletion range does not extend over a plurality of pages (i.e., a plurality of physical addresses) in the flash memories and thus does not divide the delete instruction (step S104 in FIG. 5).

Accordingly, the controller controlling unit 28 performs the deleting process corresponding to the one page (step S108 in FIG. 5).

After that, the controller controlling unit 28 first refers to the translation table shown in FIG. 10 and confirms that there is a physical address B6 that corresponds to the logical address L8 that is the processing target (step S120 in FIG. 7).

Subsequently, the controller controlling unit 28 refers to the block management table shown in FIG. 4 and searches for the FAT information identifier 21 that corresponds to the block identifier B identifying the block B that contains the page indicated by the physical address B6. After that, the controller controlling unit 28 further searches for a piece of FAT information of the page indicated by the physical address B6, out of the pieces of FAT information of the pages corresponding to the FAT information identifier 21. The controller controlling unit 28 then updates the piece of FAT information found in the search so as to indicate "D" (step S122 in FIG. 7).

Subsequently, the controller controlling unit 28 deletes an entry from the translation table shown in FIG. 10, the entry showing the correspondence relationship between the physical address B6 and the logical address L8 (step S124 in FIG. 7).

After that, the controller controlling unit 28 scans the pieces of FAT information of all the pages in the block B (i.e., all the pieces of FAT information that correspond to the FAT information identifier 21) and confirms that each of the pieces of FAT information corresponding to all the pages indicates either "D", which means "deleted", or "IV", which means "invalid" (step S126 in FIG. 7).

Subsequently, because each of the pieces of FAT information corresponding to all the pages indicates either "D" or "N/A", the controller controlling unit 28 deletes the FAT information identifier 21 corresponding to the block identifier B identifying the block B from the block management table shown in FIG. 4, and also updates the piece of use-state judging information corresponding to the block identifier B so as to indicate "unused" (steps S128 and S130 in FIG. 7). After that, because the deletion range has completely been processed, the controller controlling unit 28 ends the deleting process.

Subsequently, when having finished the deleting process, the controller controlling unit 28 notifies the instruction controlling unit 22 that the deleting process has been finished. The instruction controlling unit 22 notifies the host apparatus 2 that the deleting process based on the received delete instruction has been finished (steps S110 and S112 in FIG. 5).

Figures 11, 12:
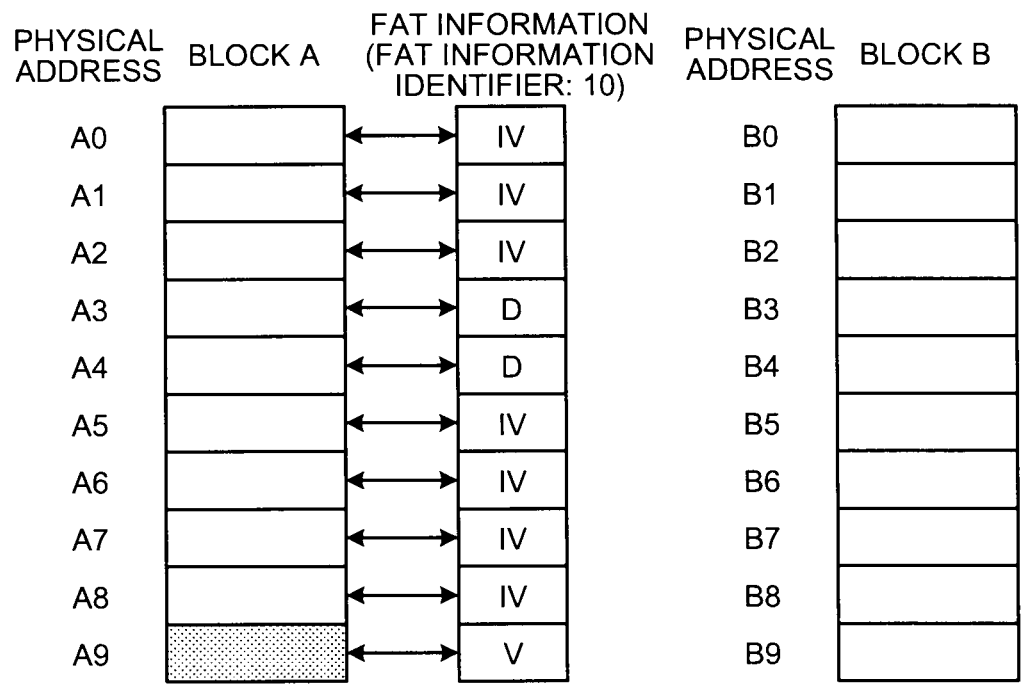
FIG. 11 is a drawing illustrating an example of the block management table obtained after another deleting process has been finished.
FIG. 12 is a drawing illustrating an example of pieces of data in the blocks after said another deleting process has been finished.
Figures 13, 14:
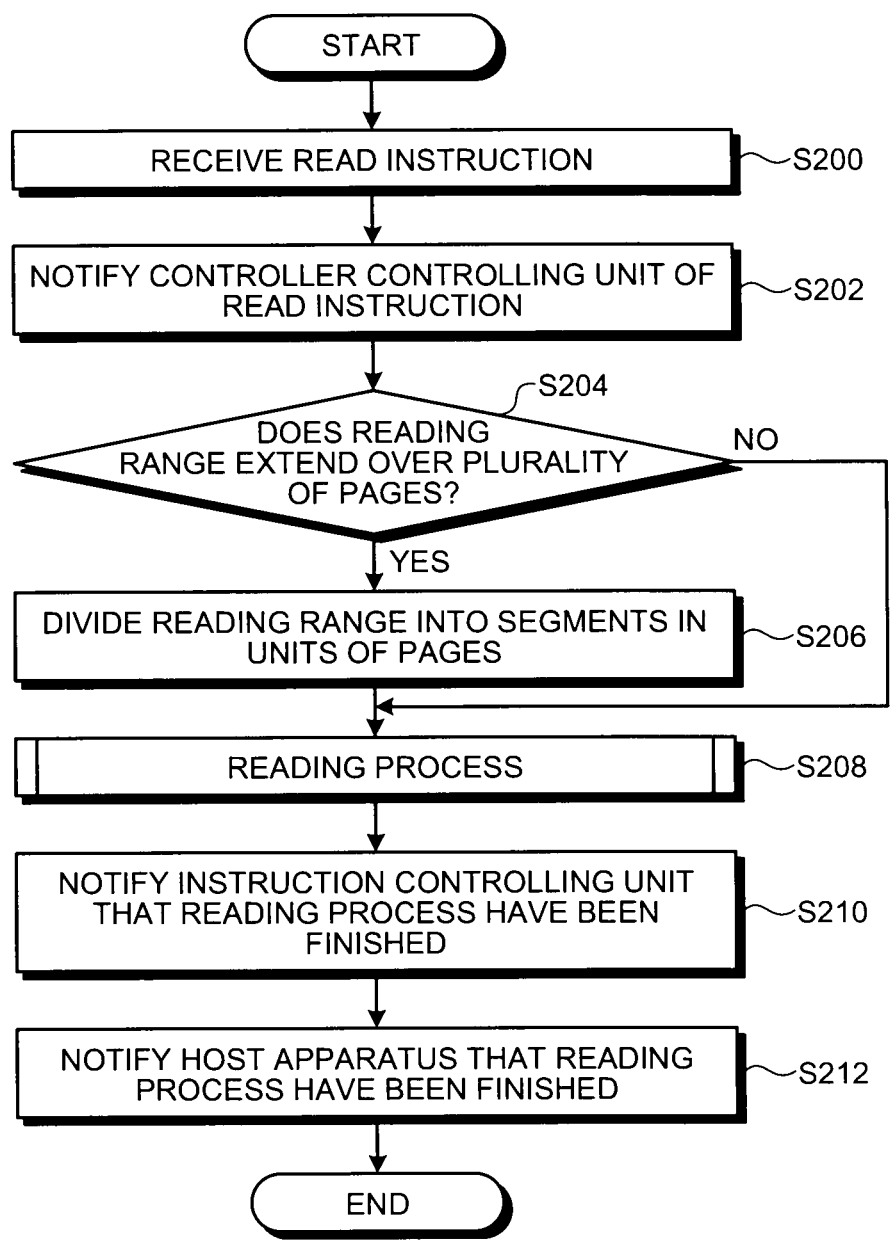
FIG. 13 is a drawing illustrating an example of the translation table obtained after said another deleting process has been finished.
FIG. 14 is an example of a flowchart of a reading operation performed in the memory system according to the first embodiment.

FIG. 11 is a drawing illustrating the state of the block management table obtained after the deleting process on the logical address LB has been finished. FIG. 12 is a schematic drawing illustrating the state of the pieces of data stored in the pages contained in the blocks after the deleting process on the logical address LB has been finished. FIG. 13 is a drawing illustrating the state of the translation table obtained after the deleting process on the logical address LB has been finished.

As shown in FIG. 11, in the block management table obtained after the deleting process on the logical address LB has been finished, the piece of use-state judging information corresponding to the block B indicates "unused", and also the FAT information identifier 21 has been deleted. Accordingly, as shown in FIG. 12, the correspondence between the pages contained in the block B and the pieces of FAT information identified with the FAT information identifier 21 has been cancelled. Thus, it is now possible to use the block B and the pieces of FAT information identified with the FAT information identifier 21 again.

Also, as shown in FIG. 13, in the translation table obtained after the deleting process on the logical address LB has been finished, the entry showing the correspondence relationship between the logical address LB and the physical address B6 has been completely deleted.

As explained above, according to the first embodiment, the pieces of FAT information are kept in correspondence with the pages contained in all the blocks that are being used. Thus, it is possible to effectively utilize the storage areas in the flash memories.

In particular, according to the first embodiment, it is possible to flexibly process the delete instructions in units of pages and to put the block back into a reusable state (i.e., a state in which data can be written into the block) with appropriate timing. Thus, it is easier to avoid the situation in which the number of writable blocks needlessly decreases and fragmentation occurs in the flash memories. As a result, it is also possible to prevent an unnecessary increase in the usage amount of the work memory. Thus, it is also possible to effectively utilize the storage area in the work memory.

Next, a reading operation performed in the memory system according to the first embodiment will be explained.

FIG. 14 is a flowchart of an example of procedures in a reading operation performed in the memory system 1 according to the first embodiment. In the following sections, the reading operation will be specifically explained, while using an example of an operation of the memory system 1 that is performed when, in the state shown in FIG. 9, a read instruction for the logical addresses L7 and L8 has been received from the host apparatus 2. A translation table and a block management table that correspond to the state shown in FIG. 9 are shown in FIGS. 10 and 4, respectively.

First, the instruction controlling unit 22 receives the read instruction issued by the host apparatus 2 (step S200). The read instruction contains a logical address indicating the head of an area in the flash memories 11 from which data is to be read and information indicating the size of the data to be read, in addition to information indicating that the type of the instruction is reading. In the present example, it is assumed that the head logical address for the reading is L7, whereas the size of the data to be read is a size corresponding to the logical addresses L7 and L8.

Subsequently, the instruction controlling unit 22 notifies the controller controlling unit 28 of the received read instruction (step S202).

After that, by referring to the size indicated in the read instruction, the controller controlling unit 28 checks to see if the reading range extends over a plurality of pages (i.e., a plurality of physical addresses) in the flash memories (step S204).

In the present example, the controller controlling unit 28 confirms that the reading range corresponds to the logical addresses L7 and L8 and that the reading range extends over two pages (i.e., a plurality of physical addresses) in the flash memories (step S204: Yes). Thus, the controller controlling unit 28 divides the received read instruction into read instructions that respectively correspond to the two pages (i.e., the read instructions each of which corresponds to a different one of the logical addresses L7 and L8) (step S206). Conversely, in the case where the reading range does not extend over a plurality of pages (step S204: No), the controller controlling unit 28 does not perform the process at step S206.

Subsequently, the controller controlling unit 28 performs a reading process according to the one or more read instructions (step S208). In the case where the read instruction has been divided into a number of read instructions, the controller controlling unit 28 performs reading processes corresponding to the number of read instructions. In other words, the controller controlling unit 28 performs a reading process for each of the pages in the reading range. In the present example, the controller controlling unit 28 performs reading processes corresponding to the two pages. The details of the reading processes will be explained later.

After that, when having finished all the reading processes, the controller controlling unit 28 notifies the instruction controlling unit 22 that the reading processes have been finished (step S210).

Subsequently, the instruction controlling unit 22 notifies the host apparatus 2 that the reading processes based on the received read instruction have been finished (step S212).

Upon this notification, the reading operation performed in the memory system 1 has been completed. The host apparatus 2 is thus able to send the next instruction to the memory system 1.

Figure 15:
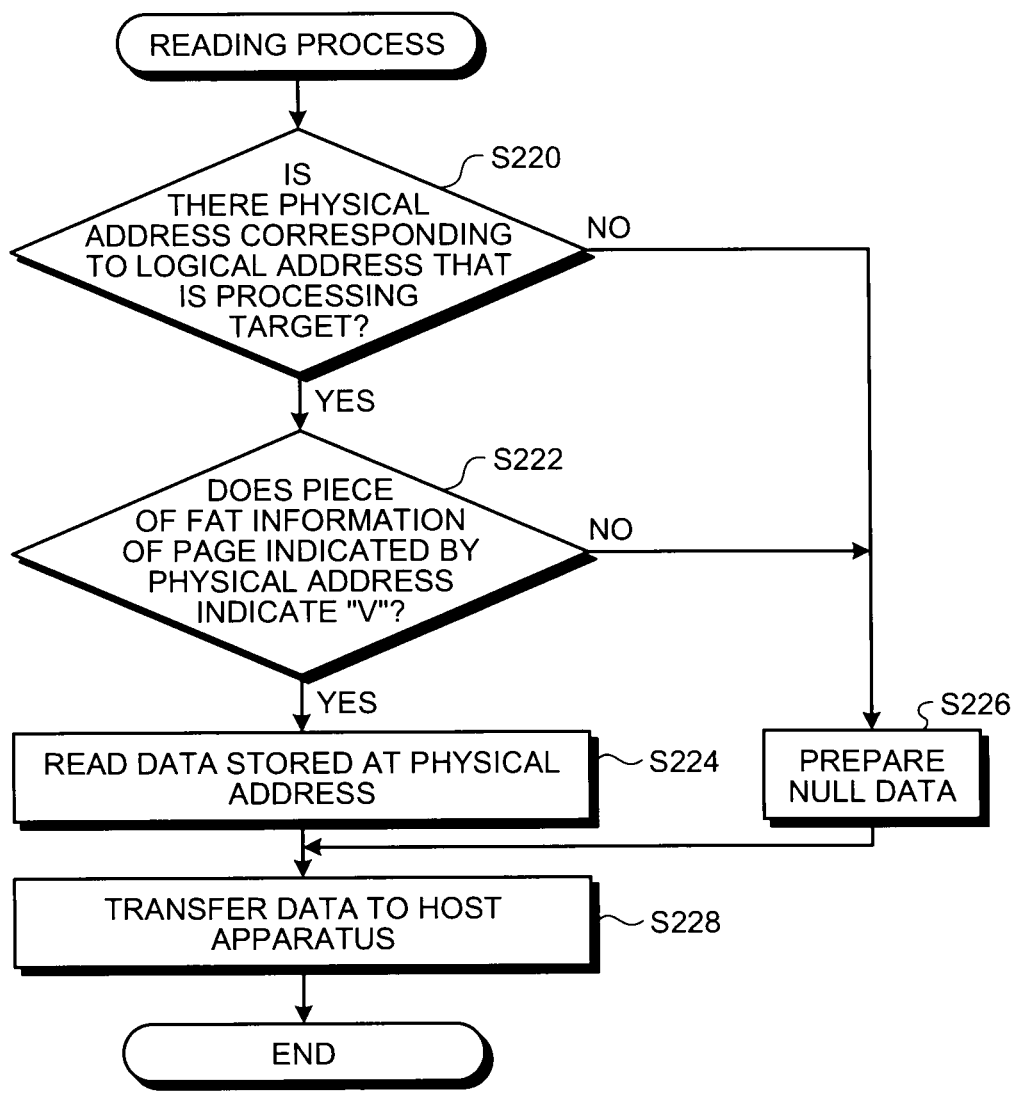
FIG. 15 is an example of a flowchart of a reading process according to the first embodiment.

FIG. 15 is a flowchart of an example of procedures in the reading process performed at step S208 shown in FIG. 14.

First, the controller controlling unit 28 refers to the translation table and checks to see if there is a physical address corresponding to the logical address that is the processing target (step S220). In the present example, by referring to the translation table shown in FIG. 10, the controller controlling unit 28 confirms that there is no physical address corresponding to the logical address L7 (step S220: No).

There is no corresponding physical address because, during the deleting process described above, the piece of FAT information of the page indicated by the physical address B4 corresponding to the logical address L7 has been updated so as to indicate "D", and also, the entry showing the correspondence relationship between the logical address L7 and the physical address B4 has been deleted from the translation table shown in FIG. 2.

Accordingly, the controller controlling unit 28 prepares null data in which the entirety of the data is "0" (step S226) and transfers the prepared null data to the host apparatus 2, as a response to the read instruction for the logical address L7 (step S228). The process performed on the logical address L7 is thus ended.

It should be noted, however, that the logical address L8 has not yet been processed, and the reading range has not completely been processed. Thus, the controller controlling unit 28 further performs a process on the logical address L8.

By referring to the translation table shown in FIG. 10, the controller controlling unit 28 confirms that there is the physical address B6 that corresponds to the logical address L8 (step S220: Yes).

Subsequently, the controller controlling unit 28 refers to the block management table shown in FIG. 4 and searches for the FAT information identifier 21 that corresponds to the block identifier B identifying the block B that contains the page indicated by the physical address B6. After that, the controller controlling unit 28 further searches for a piece of FAT information of the page indicated by the physical address B6, out of the pieces of FAT information of the pages corresponding to the FAT information identifier 21. The controller controlling unit 28 then confirms that the piece of FAT information found in the search indicates "V" (step S222: Yes).

Subsequently, the controller controlling unit 28 reads the data stored in the page indicated by the physical address B6 (step S224) and transfers the read data to the host apparatus 2, as a response to the read instruction for the logical address L8 (step S228). Conversely, in the case where the piece of FAT information of the page indicated by the physical address B6 does not indicate "V" (step S222: No), the procedure proceeds to step S226 so that the controller controlling unit 28 prepares null data.

After that, because the reading range has completely been processed, the controller controlling unit 28 ends the reading process.

As explained above, according to the first embodiment, a reading error is addressed by returning the null data. Thus, it is possible to simplify the error process.

Next, a writing operation performed in the memory system according to the first embodiment will be explained.

Figure 16:
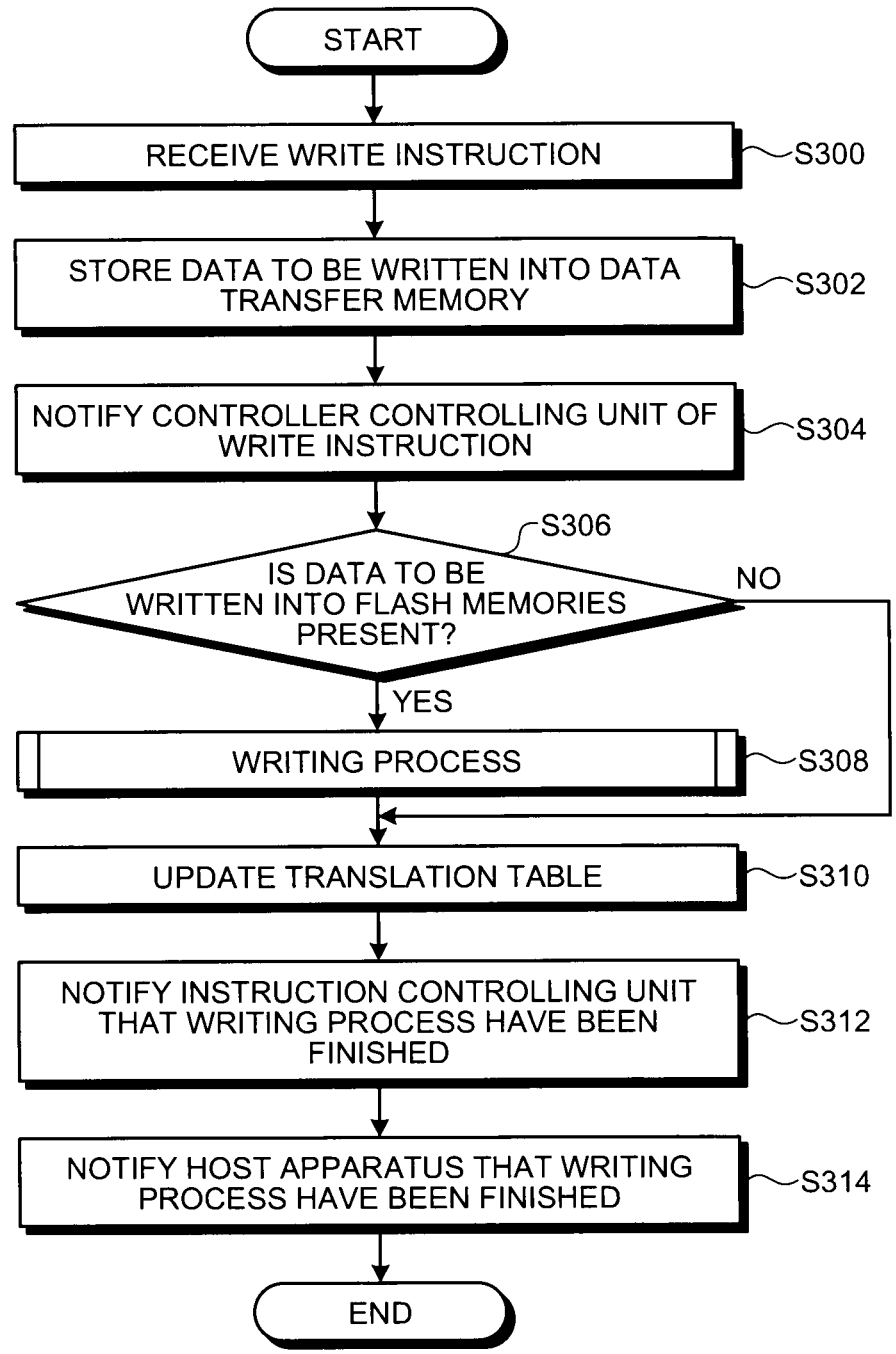
FIG. 16 is an example of a flowchart of a writing operation performed in the memory system according to the first embodiment.

FIG. 16 is a flowchart of an example of procedures in the writing operation performed in the memory system 1 according to the first embodiment.

First, the instruction controlling unit 22 receives a write instruction issued by the host apparatus 2 (step S300). The write instruction contains a logical address indicating the head of an area in the flash memories 11 into which the data is to be written and information indicating the size of the data to be written, in addition to information indicating that the type of the instruction is writing.

Subsequently, the instruction controlling unit 22 starts receiving the data to be written that is transmitted from the host apparatus 2 via the external bus 3 and starts storing the received data to be written into the data transfer memory 30 (step S302).

After that, the instruction controlling unit 22 notifies the controller controlling unit 28 of the received write instruction (step S304). The instruction controlling unit 22 also notifies the controller controlling unit 28 of the position (i.e., the address) in the data transfer memory 30 where the data to be written is stored, as well as of the write instruction.

Subsequently, when the data to be written that corresponds to the size indicated in the write instruction has been stored in the data transfer memory 30, the controller controlling unit 28 judges whether the data to be written into the flash memories 11 is present, by taking, for example, the following factors into consideration: the logical address and the size that are indicated in the write instruction; the state of the data transfer memory 30; and the state of the flash memories 11 (step S306).

The controller controlling unit 28 judges whether the data to be written into the flash memories 11 is present by, for example, judging whether the data transfer memory 30 stores therein a string of data that has the same size as the size of each block (hereinafter, the "block size") in the flash memories 11 or considering the free space in the data transfer memory 30.

In the case where the data to be written is not present (step S306: No), by referring to the logical address indicated in the write instruction and the size of the data that has been stored in the data transfer memory 30, the controller controlling unit 28 calculates a logical address up to which the data has been stored into the data transfer memory 30 and updates the contents of the translation table (step S310).

In the present example, for the purpose of dealing with the situation in which a read instruction for the logical address indicated in the write instruction is issued by the host apparatus 2, the controller controlling unit 28 brings the logical address into correspondence with the address in the data transfer memory 30 in the translation table so that it is possible to read the data directly from the data transfer memory 30, not from the flash memories 11.

On the contrary, in the case where the data to be written into the flash memories 11 is present (step S306: Yes), the controller controlling unit 28 performs a writing process to write the data into the flash memories 11 (step S308). The writing process is performed for the block size or a size smaller than the block size. Thus, in the case where the size of the data to be written is larger than the block size, a writing process is repeatedly performed until the writing has been completed for the size of the data to be written. The details of the writing process will be explained later.

After that, when the writing processes to the flash memories 11 have been finished, the controller controlling unit 28 updates the contents of the translation table based on the correspondence relationships between the logical addresses indicated in the write instruction and the physical addresses indicating the areas in the flash memories 11 into which the data has been written (step S310).

Subsequently, the controller controlling unit 28 notifies the instruction controlling unit 22 that the writing processes have been finished (step S312).

After that, the instruction controlling unit 22 notifies the host apparatus 2 that the writing processes based on the received write instruction have been finished (step S314).

Upon this notification, the writing operation performed in the memory system 1 has been completed. The host apparatus 2 is thus able to send the next instruction to the memory system 1.

Figure 17:
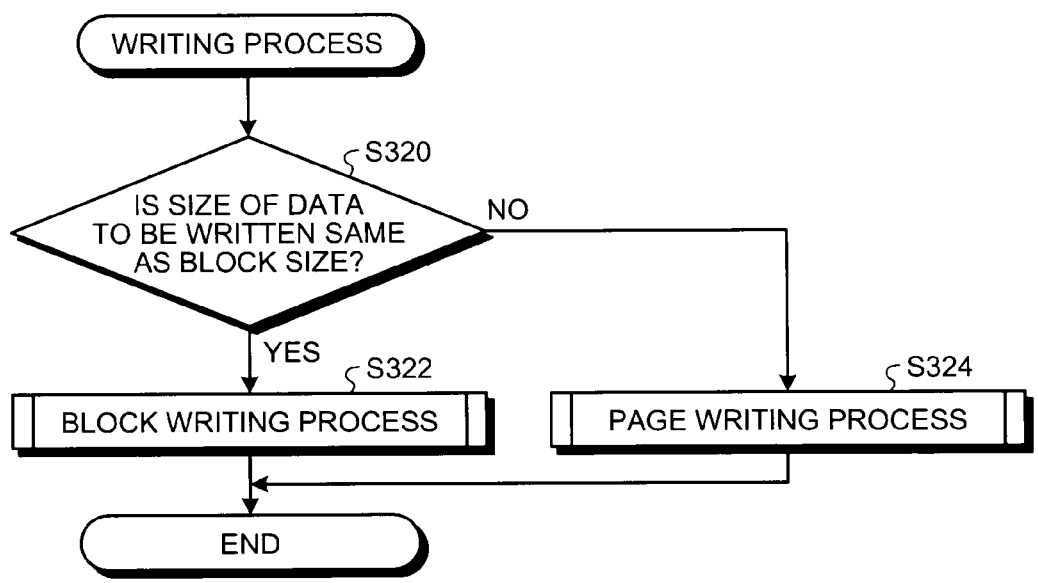
FIG. 17 is an example of a flowchart of a writing process according to the first embodiment.

FIG. 17 is a flowchart of an example of procedures in the writing process performed at step S308 shown in FIG. 16.

First, the controller controlling unit 28 checks to see if the size of the data to be written is the same as the block size in the flash memories 11 (step S320).

In the case where the size of the data to be written is the same as the block size, the controller controlling unit 28 performs a block writing process (step S322). On the contrary, in the case where the size of the data to be written is smaller than the block size, the controller controlling unit 28 performs a page writing process (step S324). In the flash memories, the block writing process is easier than the page writing process. Thus, according to the first embodiment, the block writing process and the page writing process are separate from each other.

Figure 18:
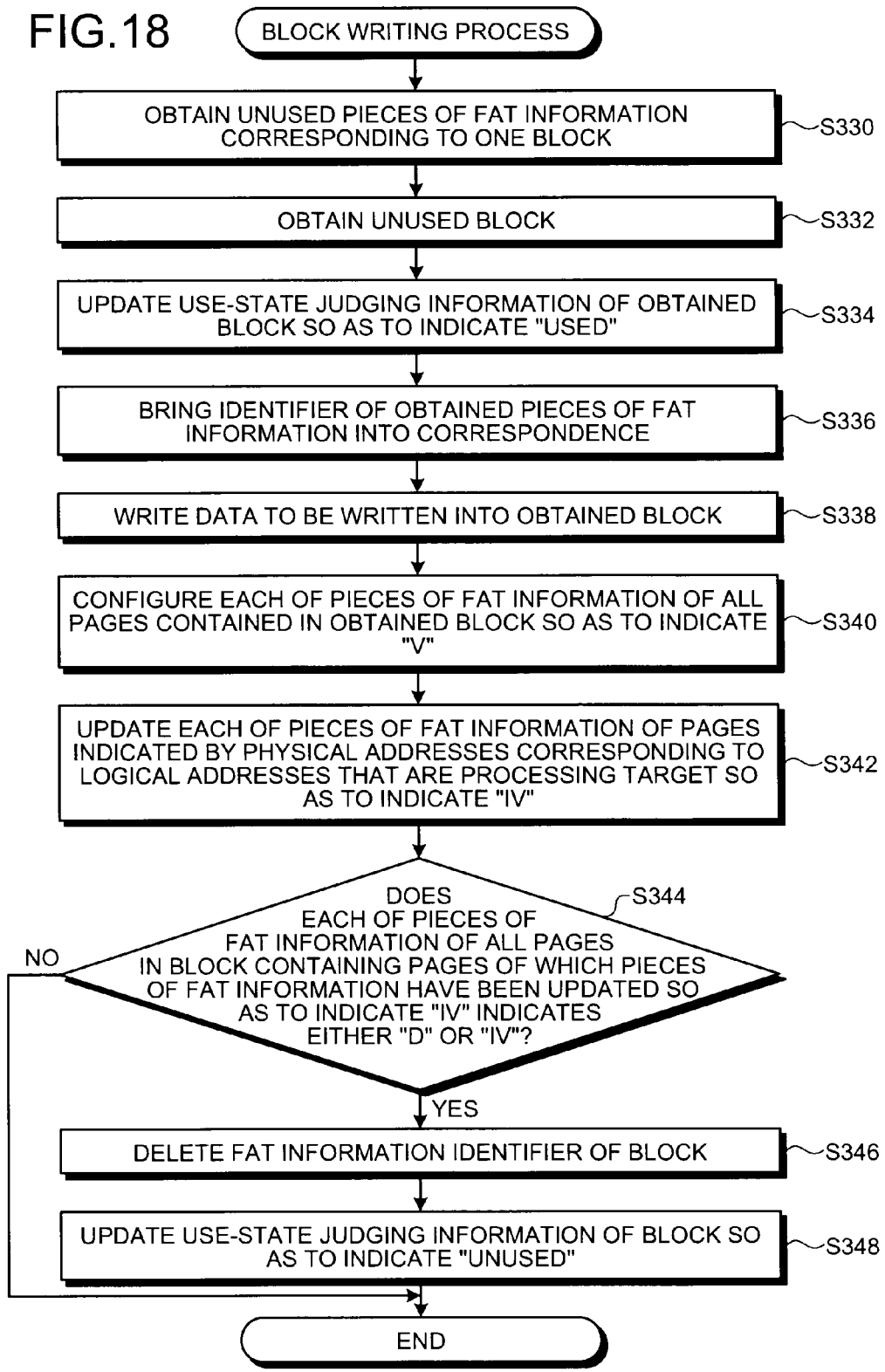
FIG. 18 is an example of a flowchart of a block writing process according to the first embodiment.

FIG. 18 is a flowchart of an example of procedures in the block writing process shown at step S322 shown in FIG. 17.

First, the controller controlling unit 28 obtains unused pieces of FAT information corresponding to one block out of the FAT information storage unit 34 (step S330). In this situation, the controller controlling unit 28 configures each of all the obtained pieces of FAT information so as to indicate "N/A", which means "unwritten". It is possible to judge whether pieces of FAT information are unused by checking the block management table to see if the identifier has not been brought into correspondence with any of the blocks.

Subsequently, the controller controlling unit 28 obtains a block of which the piece of use-state judging information indicates "unused" in the block management table (step S332).

After that, the controller controlling unit 28 updates the block management table so that the piece of use-state judging information of the obtained block indicates "used" (step S334).

Subsequently, in the block management table, the controller controlling unit 28 brings the block identifier of the obtained block into correspondence with the FAT information identifier of the obtained pieces of FAT information corresponding to the one block (step S336).

After that, the controller controlling unit 28 instructs the flash memory controlling unit 24 to write the data to be written into the obtained block (step S338). When data is newly written into any of the blocks in the flash memories, it is necessary to erase the data in the block first. However, as long as the old piece of data has been erased before the point of time at which the new piece of data is written, it does not matter when the old piece of data is erased.

After that, the controller controlling unit 28 configures each of the pieces of FAT information of the pages contained in the block into which the data has been written so as to indicate "V", which means the data stored in the pages is valid (step S340).

Subsequently, the controller controlling unit 28 refers to the translation table and updates each of the pieces of FAT information of the pages indicated by the physical addresses that currently correspond to the logical addresses (i.e., the logical addresses indicated in the write instruction) that are the processing target so as to indicate "IV", which means "invalid" (step S342).

After that, the controller controlling unit 28 scans the pieces of FAT information of all the pages in the block containing the pages of which the pieces of FAT information have been updated so as to indicate "IV" and checks to see if each of the pieces of FAT information corresponding to all the pages indicates either "D" or "IV" (step S344). In the case where at least one of the pieces of FAT information corresponding to all the pages indicates other than "D" or "IV" (step S344: No), the process is ended.

On the contrary, in the case where each of the pieces of FAT information corresponding to all the pages indicates either "D" or "IV" (step S344: Yes), the controller controlling unit 28 deletes the FAT information identifier that corresponds to the block identifier identifying the block from the block management table (step S346).

After that, the controller controlling unit 28 brings the block into an unused state by updating the block management table so that the piece of use-state judging information corresponding to the block identifier of the block indicates "unused" (step S348).

Figure 19:
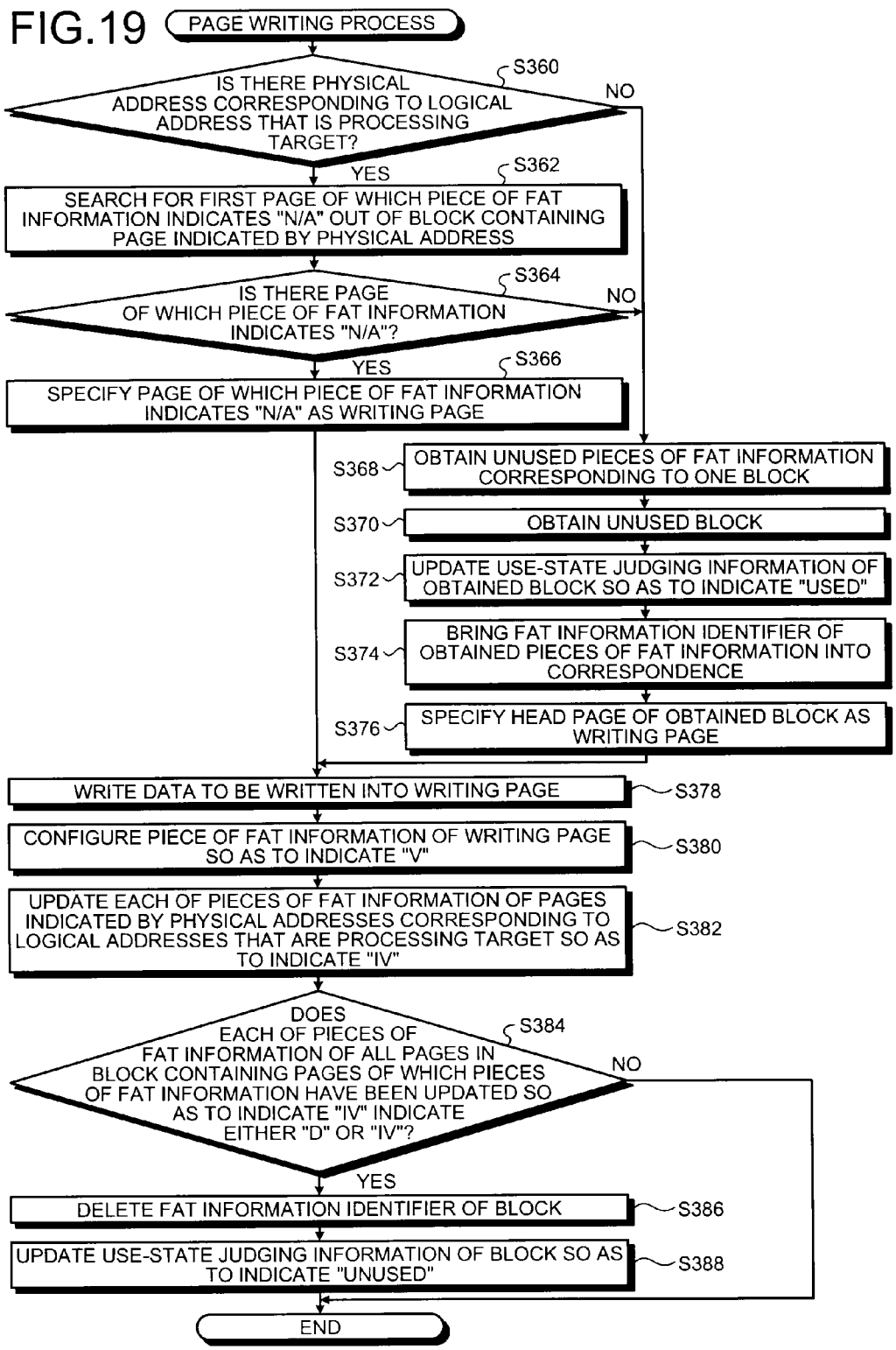
FIG. 19 is an example of a flowchart of a page writing process according to the first embodiment.

FIG. 19 is a flowchart of an example of procedures in the page writing process at step S324 shown in FIG. 17.

First, the controller controlling unit 28 refers to the translation table and checks to see if there is already a physical address corresponding to the logical address that is the processing target (step S360).

In the case where there is already the physical address corresponding to the logical address that is the processing target (step S360: Yes), the controller controlling unit 28 searches for the first page of which the piece of FAT information indicates "N/A" out of the block containing the page indicated by the physical address (step S362).

In the case where there is a page of which the piece of FAT information indicates "N/A" (step S364: Yes), the controller controlling unit 28 specifies the page as a writing page (step S366).

After that, the controller controlling unit 28 instructs the flash memory controlling unit 24 to write the data to be written into the page that has been specified as the writing page (step S378).

On the contrary, in the case where there is no physical address corresponding to the logical address that is the processing target (step S360: No) or in the case where there is no page of which the piece of FAT information indicates "N/A" (step S364: No), the controller controlling unit 28 obtains unused pieces of FAT information corresponding to one block out of the FAT information storage unit 34 (step S368). In this situation, the controller controlling unit 28 configures each of all the obtained pieces of FAT information so as to indicate "N/A", which means "unwritten".

After that, the controller controlling unit 28 obtains a block of which the piece of use-state judging information indicates "unused" in the block management table (step S370).

Subsequently, the controller controlling unit 28 updates the block management table so that the piece of use-state judging information of the obtained block indicates "used" (step S372).

After that, in the block management table, the controller controlling unit 28 brings the block identifier of the obtained block into correspondence with the FAT information identifier of the obtained pieces of FAT information corresponding to the one block (step S374).

Subsequently, the controller controlling unit 28 specifies the head page of the obtained block as a writing page (step S376).

After that, the controller controlling unit 28 instructs the flash memory controlling unit 24 to write the data to be written into the page that has been specified as the writing page (step S378).

Subsequently, the controller controlling unit 28 configures the piece of FAT information of the writing page into which the data has been written so as to indicate "V", which means that the data stored in the page is valid (step S380).

The processes thereafter (i.e., steps S382 to S388) are the same as the processes performed at steps S342 to S348 in the flowchart of the block writing process shown in FIG. 18. Thus, the explanation thereof will be omitted.

Next, a specific example of the writing operation performed in the memory system according to the first embodiment will be explained.

In the following sections, a writing operation of the memory system 1 that is performed when a write instruction corresponding to the size of one block for the logical addresses L0 to L9 that have not been brought into correspondence with physical addresses has been received from the host apparatus 2 will be explained, with reference to the flowcharts in FIGS. 16 to 19.

First, the instruction controlling unit 22 receives the write instruction issued by the host apparatus 2, starts receiving the data to be written, and starts storing the received data to be written into the data transfer memory 30 (steps S300 and S302 in FIG. 16).

After that, the instruction controlling unit 22 notifies the controller controlling unit 28 of the position in the data transfer memory 30 where the data to be written is stored, as well as of the received write instruction (step S304 in FIG. 16).

Subsequently, when the data to be written that corresponds to the size indicated in the write instruction has been stored in the data transfer memory 30, the controller controlling unit 28 judges whether the data to be written into the flash memories 11 is present (step S306 in FIG. 16). In the present example, let us assume that the controller controlling unit 28 judges that the data to be written into the flash memories 11 is present and performs a writing process (step S308 in FIG. 16).

Subsequently, because the size of the data to be written is one block, the controller controlling unit 28 performs a block writing process (step S322 in FIG. 17).

After that, the controller controlling unit 28 obtains unused pieces of FAT information corresponding to one block out of the FAT information storage unit 34 (step S330 in FIG. 18). In the present example, let us assume that the controller controlling unit 28 obtains the pieces of FAT information identified with the FAT information identifier 10. In this situation, the controller controlling unit 28 configures each of all the obtained pieces of FAT information identified with the FAT information identifier 10 so as to indicate "N/A", which means "unwritten".

Subsequently, the controller controlling unit 28 obtains a block of which the piece of use-state judging information indicates "unused" in the block management table (step S332 in FIG. 18). In the present example, let us assume that the controller controlling unit 28 obtains the block A identified with the block identifier A.

After that, the controller controlling unit 28 updates the block management table so that the piece of use-state judging information of the block A indicates "used" and brings the FAT information identifier 10 into correspondence with the block A (steps S334 and S336 in FIG. 18).

Subsequently, the controller controlling unit 28 writes the data to be written that has been stored in the data transfer memory 30 into the block A and configures each of the pieces of FAT information of the pages contained in the block A so as to indicate "V" (steps S338 and S340 in FIG. 18).

After that, the controller controlling unit 28 refers to the translation table and confirms that there are no physical addresses that currently correspond to the logical addresses L0 to L9 that are the processing target. Thus, the processes at step S342 and thereafter in FIG. 18 will not be performed, and the block writing process is ended.

Subsequently, the controller controlling unit 28 updates the contents of the translation table with entries in which the logical addresses L0 to L9 indicated in the write instruction are kept in correspondence with the physical addresses A0 to A9 indicating the areas in the flash memories 11 into which the data has been written (step S310 in FIG. 16).

After that, when the writing process has been finished, the controller controlling unit 28 notifies the instruction controlling unit 22 that the writing process has been finished. The instruction controlling unit 22 notifies the host apparatus 2 that the writing process based on the received write instruction has been finished (steps S312 and S314 in FIG. 16).

Figures 20, 21:
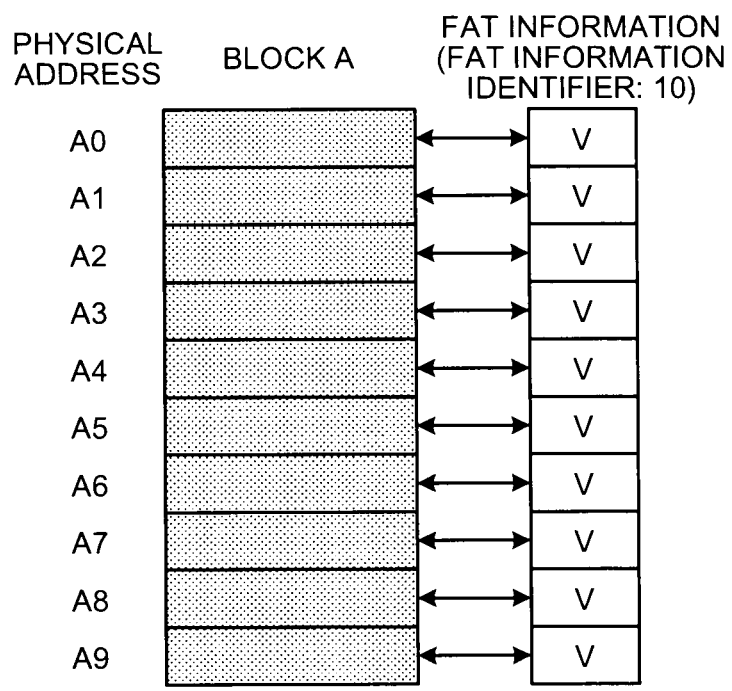
FIG. 20 is a drawing illustrating an example of the block management table obtained after a writing process has been finished.
FIG. 21 is a drawing illustrating an example of pieces of data in a block after the writing process has been finished.

FIG. 20 is a drawing illustrating the state of the block management table obtained after the writing process on the logical addresses L0 to L9 has been finished. FIG. 21 is a schematic drawing illustrating the state of the pieces of data stored in the pages contained in the block, after the writing process on the logical addresses L0 to L9 has been finished. FIG. 22 is a drawing illustrating the state of the translation table obtained after the writing process on the logical addresses L0 to L9 has been finished.

As shown in FIG. 20, in the block management table obtained after the writing process on the logical addresses L0 to L9 has been finished, the piece of use-state judging information of the block A indicates "used", and the FAT information identifier 10 has been brought into correspondence with the block A. Accordingly, as shown in FIG. 21, the pages contained in the block A are kept into correspondence with the pieces of FAT information identified with the FAT information identifier 10. Each of all the pieces of FAT information indicates "V".

Also, as shown in FIG. 22, the translation table obtained after the writing process on the logical addresses L0 to L9 has been finished shows the correspondence relationships between the logical addresses L0 to L9 and the physical addresses A0 to A9.

Next, a writing operation of the memory system 1 that is performed when, in the state shown in FIG. 21, a write instruction corresponding to the size of one page for the logical address L1 has been received from the host apparatus 2 will be explained, with reference to the flowcharts in FIGS. 16 to 19.

First, the instruction controlling unit 22 receives a write instruction issued by the host apparatus 2, starts receiving the data to be written, and starts storing the received data to be written into the data transfer memory 30 (steps S300 and S302 in FIG. 16).

After that, the instruction controlling unit 22 notifies the controller controlling unit 28 of the position in the data transfer memory 30 where the data to be written is stored, as well as of the received write instruction (step S304 in FIG. 16).

Subsequently, when the data to be written that corresponds to the size indicated in the write instruction has been stored in the data transfer memory 30, the controller controlling unit 28 judges whether the data to be written into the flash memories 11 is present (step S306 in FIG. 16). In the present example, let us assume that the controller controlling unit 28 judges that the data to be written into the flash memories 11 is present and performs a writing process (step S308 in FIG. 16).

Subsequently, because the size of the data to be written is one page, the controller controlling unit 28 performs a page writing process (step S324 in FIG. 17).

After that, the controller controlling unit 28 refers to the translation table shown in FIG. 22 and confirms that there is already a physical address A1 that corresponds to the logical address L1 that is the processing target. Accordingly, the controller controlling unit 28 searches for the first page of which the piece of FAT information indicates "N/A" out of the block A containing the page indicated by the physical address A1 (steps S360 and S362 in FIG. 19).

More specifically, the controller controlling unit 28 refers to the block management table shown in FIG. 20 and searches for the FAT information identifier 10 that corresponds to the block identifier A identifying the block A containing the page indicated by the physical address A1. After that, the controller controlling unit 28 searches for the first page of which the piece of FAT information indicates "N/A", out of the pieces of FAT information of the pages that correspond to the FAT information identifier 10.

In the present example, as shown in FIG. 21, the pages that correspond to the FAT information identifier 21 include no page of which the piece of FAT information indicates "N/A". Thus, the controller controlling unit 28 obtains unused pieces of FAT information corresponding to one block out of the FAT information storage unit 34 (steps S364 and S368 in FIG. 19). In the present example, let us assume that the controller controlling unit 28 obtains the pieces of FAT information corresponding to the FAT information identifier 21. In this situation, the controller controlling unit 28 configures each of all the obtained pieces of FAT information identified with the FAT information identifier 21 so as to indicate "N/A", which means "unwritten".

After that, the controller controlling unit 28 obtains a block of which the piece of use-state judging information indicates "unused" in the block management table (step S370 in FIG. 19). In the present example, let us assume that the controller controlling unit 28 obtains the block B identified with the block identifier B.

Subsequently, the controller controlling unit 28 updates the block management table so that the piece of use-state judging information of the block B indicates "used" and brings the FAT information identifier 21 into correspondence with the block B (steps S372 and S374 in FIG. 19).

Subsequently, the controller controlling unit 28 specifies the head page of the obtained block B as a writing page, writes the data to be written that has been stored in the data transfer memory 30 into the head page of the block B, and configures the piece of FAT information of the head page of the block B so as to indicate "V" (steps S376, S378, and S380 in FIG. 19).

After that, the controller controlling unit 28 refers to the translation table shown in FIG. 22 and updates the piece of FAT information of the page indicated by the physical address A1 that currently corresponds to the logical address L1 that is the processing target so as to indicate "IV", which means "invalid" (step S382 in FIG. 19).

Subsequently, the controller controlling unit 28 scans the pieces of FAT information of all the pages in the block B containing the page of which the piece of FAT information has been updated so as to indicate "IV" and confirms that at least one of the pieces of FAT information corresponding to all the pages indicates other than "D" or "IV" (step S384 in FIG. 19). The controller controlling unit 28 thus ends the page writing process.

Subsequently, the controller controlling unit 28 updates the contents of the translation table with an entry in which the logical address L1 indicated in the write instruction is kept in correspondence with the physical addresses B0 indicating the area in the flash memories 11 into which the data has been written (step S310 in FIG. 16).

After that, when the writing process has been finished, the controller controlling unit 28 notifies the instruction controlling unit 22 that the writing process has been finished. The instruction controlling unit 22 notifies the host apparatus 2 that the writing process based on the received write instruction has been finished (steps S312 and S314 in FIG. 16).

FIG. 23 is a drawing illustrating the state of the block management table obtained after the writing process on the logical address L1 has been finished. FIG. 24 is a schematic drawing illustrating the state of the pieces of data stored in the pages contained in the blocks, after the writing process on the logical address L1 has been finished. FIG. 25 is a drawing illustrating the state of the translation table obtained after the writing process on the logical address L1 has been finished.

As shown in FIG. 23, in the block management table obtained after the writing process on the logical address L1 has been finished, the piece of use-state judging information of the block B indicates "used", and the FAT information identifier 21 has been brought into correspondence with the block B.

Accordingly, as shown in FIG. 24, the pages contained in the block B are brought into correspondence with the pieces of FAT information identified with the FAT information identifier 21. The piece of FAT information of the page into which the data has been written (i.e., the page indicated by the physical address B0) indicates "V". Also, the piece of FAT information for the physical address A1 that had been in correspondence with the logical address L1 before the writing process on the logical address L1 was performed indicates "IV".

Also, as shown in FIG. 25, the translation table obtained after the writing process on the logical address L1 has been finished shows the correspondence relationship between the logical address L1 and the physical address B0.

As explained above, according to the first embodiment, every time a new piece of data is written into an unused block in the flash memories during a writing process, the information is updated so that the block is indicated as being in a usable state, and the pieces of FAT information are brought into correspondence with the pages contained in the block. As a result, it is possible to effectively utilize the storage areas in the flash memories as described above.

In the description of the first embodiment above, the data is written into the flash memories 11 during the procedure in the writing process. However, another arrangement is acceptable in which the writing to the flash memories 11 is only reserved during the writing process so that the data is actually written into the flash memories 11 after the host apparatus 2 has been notified that the writing process has been finished.

Next, a second embodiment of the present invention will be explained, while using an example in which an entry showing a correspondence relationship between a logical address and a physical address is deleted from the translation table in the case where each of the pieces of FAT information of all the pages in a block indicates either "D" or "IV", but not every time a piece of FAT information is updated so as to indicate "D", which means "deleted".

In the following sections, the second embodiment will be explained while a focus is mainly placed on differences from the first embodiment. Some of the constituent elements in the second embodiment that have the same functions as those in the first embodiment will be referred to by using the same names and the same reference characters used in the first embodiment, and the explanation thereof will be omitted.

Figure 26:
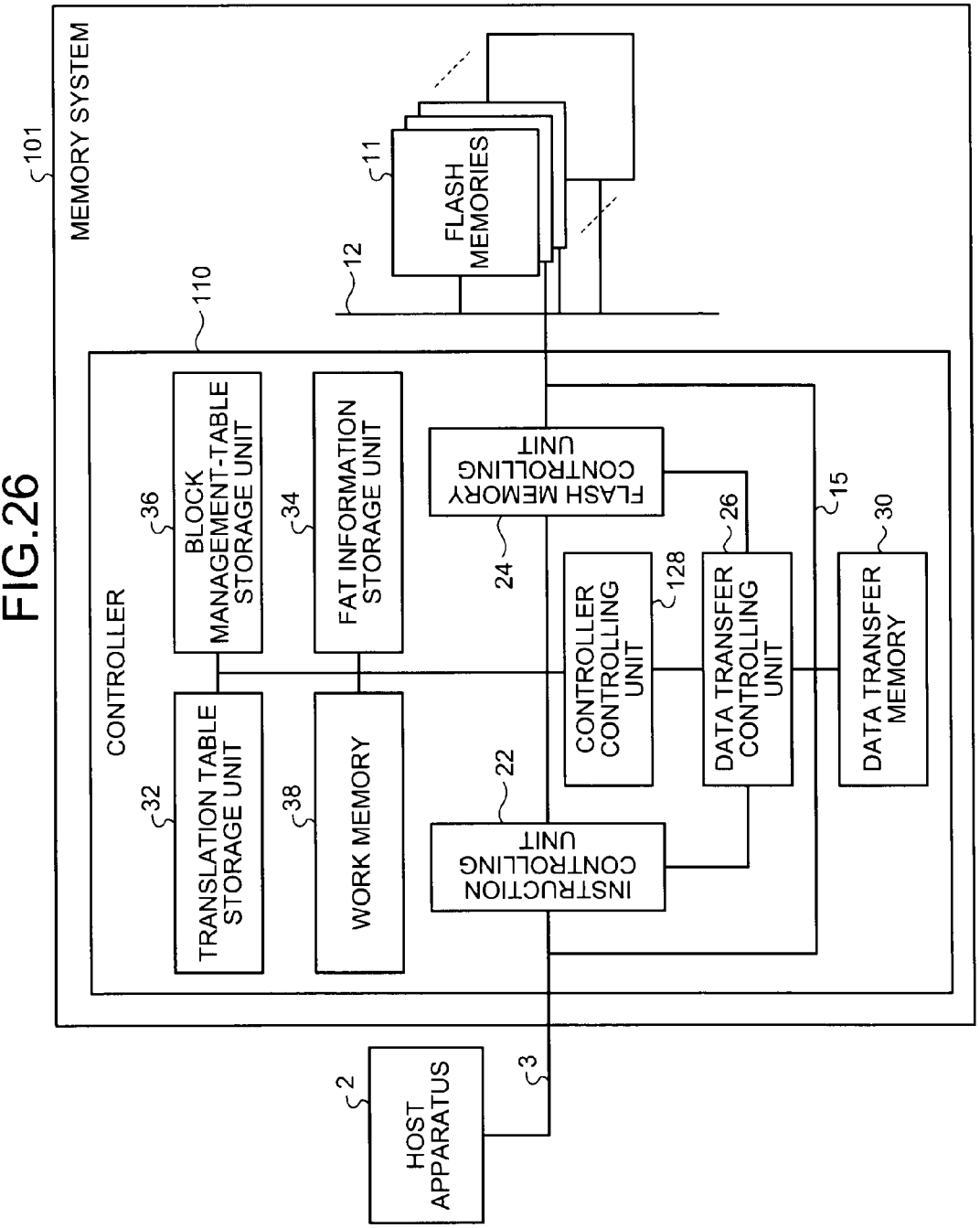
FIG. 26 is a block diagram of a memory system according to a second embodiment of the present invention.

FIG. 26 is a block diagram of an example of a memory system 101 according to the second embodiment.

In the memory system 101, the timing with which a controller controlling unit 128 included in a controller 110 updates a translation table stored in the translation table storage unit 32 is different from the timing used in the memory system 1 according to the first embodiment.

Accordingly, in the following sections, the timing with which the controller controlling unit 128 updates the translation table, which is a main difference between the first embodiment and the second embodiment, will be explained.

Figure 27:
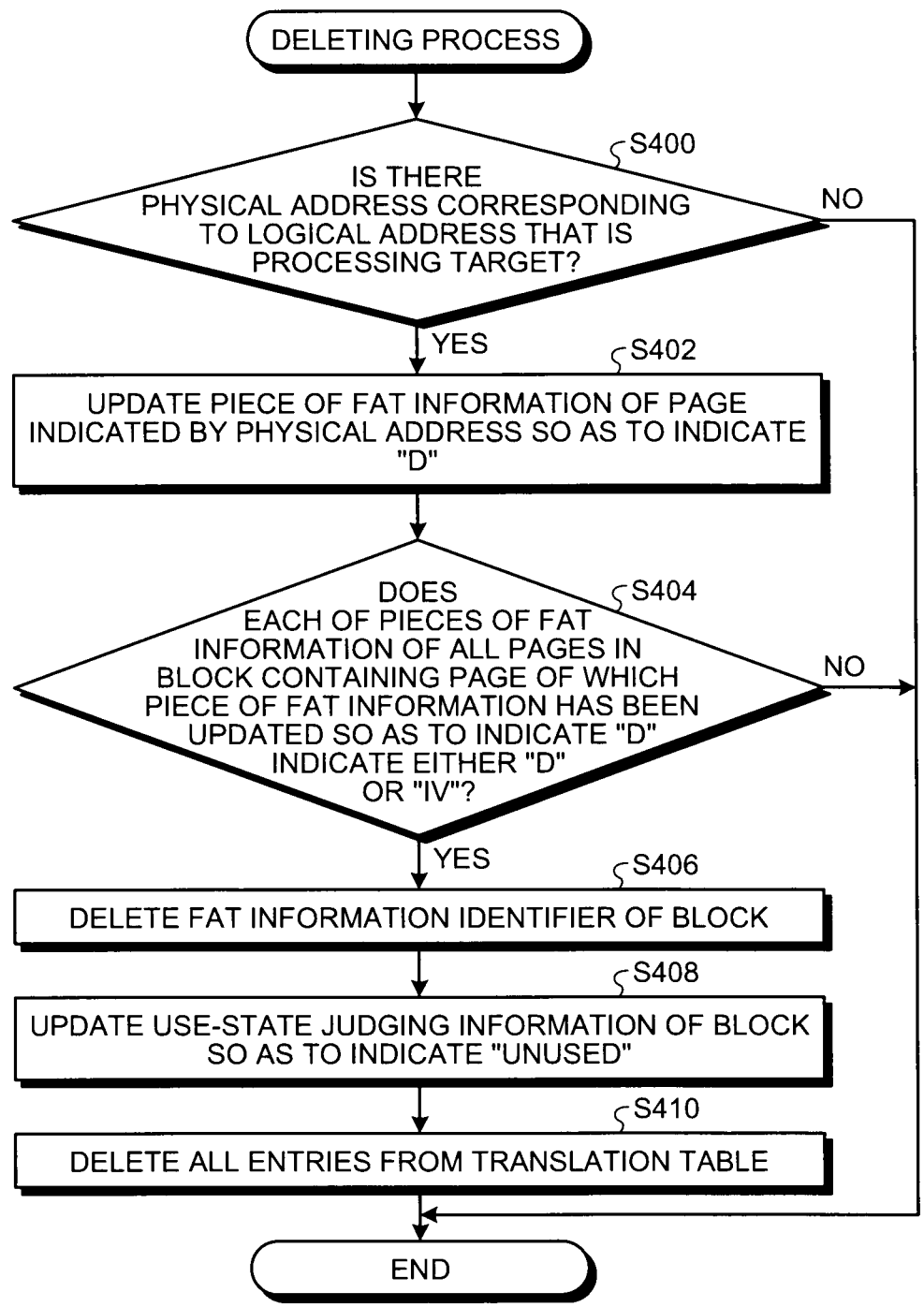
FIG. 27 is an example of a flowchart of a deleting process according to the second embodiment.

FIG. 27 is a flowchart of an example of procedures in the deleting process at step S108 shown in FIG. 5 that is performed in the memory system 101 according to the second embodiment. The flow of the procedures in the deleting operation is the same as the one according to the first embodiment.

In the following sections, an operation of the memory system 101 that is performed when, in the state shown in FIG. 8, a delete instruction for the logical addresses L0 to L7 has been received from the host apparatus 2 will be explained, with reference to the flowcharts in FIGS. 5 and 27.

First, the instruction controlling unit 22 receives the delete instruction issued by the host apparatus 2 and notifies the controller controlling unit 128 of the received delete instruction (steps S100 and S102 in FIG. 5).

Subsequently, because the deletion range is at the logical addresses L0 to L7, the controller controlling unit 128 confirms that the deletion range extends over eight pages (i.e., a plurality of physical addresses) in the flash memories and thus divides the delete instruction into delete instructions that respectively correspond to the eight pages (i.e., the delete instructions each of which corresponds to a different one of the logical addresses L0 to L7) (steps S104 and S106 in FIG. 5).

Accordingly, the controller controlling unit 128 performs the deleting processes corresponding to the eight pages (step S108 in FIG. 5).

After that, the controller controlling unit 128 first refers to the translation table shown in FIG. 2 and confirms that there is the physical address B0 that corresponds to the logical address L0 that is the processing target (step S400 in FIG. 27).

Subsequently, the controller controlling unit 128 refers to the block management table shown in FIG. 4 and searches for the FAT information identifier 21 that corresponds to the block identifier B identifying the block B that contains the page indicated by the physical address B0. After that, the controller controlling unit 128 further searches for a piece of FAT information of the page indicated by the physical address B0, out of the pieces of FAT information of the pages corresponding to the FAT information identifier 21. The controller controlling unit 128 then updates the piece of FAT information found in the search so as to indicate "D" (step S402 in FIG. 27).

Subsequently, the controller controlling unit 128 scans the pieces of FAT information of all the pages in the block B (i.e., all the pieces of FAT information that correspond to the FAT information identifier 21). However, because at least one of the pieces of FAT information corresponding to all the pages indicates other than "D" or "IV", the process performed on the logical address L0 is ended at this point (step S404 in FIG. 27).

It should be noted, however, that the logical addresses L1 to L7 have not yet been processed, and the deletion range has not completely been processed. Thus, the controller controlling unit 128 repeatedly performs the deleting process described here (i.e., steps S400 to S404 in FIG. 27) for each of the logical addresses L1 to L7. The explanation of the deleting processes performed on the logical addresses L1 to L7 will be omitted.

Subsequently, when having finished all the deleting processes, the controller controlling unit 128 notifies the instruction controlling unit 22 that the deleting processes have been finished. The instruction controlling unit 22 notifies the host apparatus 2 that the deleting processes based on the received delete instruction has been finished (steps S110 and S112 in FIG. 5).

In this situation, a schematic drawing illustrating the state of the pieces of data stored in the pages contained in the block after the deleting processes on the logical addresses L0 to L7 have been finished is shown in FIG. 9. The translation table obtained after the deleting processes on the logical addresses L0 to L7 have been finished is still in the state shown in FIG. 2.

Next, a deleting operation of the memory system 1 that is performed when, in the state shown in FIG. 9, a delete instruction for the logical address L8 has further been received from the host apparatus 2 will be explained, with reference to the flowcharts in FIGS. 5 and 27.

First, the instruction controlling unit 22 receives the delete instruction issued by the host apparatus 2 and notifies the controller controlling unit 128 of the received delete instruction (steps S100 and S102 in FIG. 5).

Subsequently, because the deletion range is only at the logical address L8, the controller controlling unit 128 confirms that the deletion range does not extend over a plurality of pages (i.e., a plurality of physical addresses) in the flash memories and thus does not divide the delete instruction (step S104 in FIG. 5).

Accordingly, the controller controlling unit 128 performs the deleting process corresponding to the one page (step S108 in FIG. 5).

After that, the controller controlling unit 128 first refers to the translation table shown in FIG. 2 and confirms that there is the physical address B6 that corresponds to the logical address L8 that is the processing target (step S400 in FIG. 27).

Subsequently, the controller controlling unit 128 refers to the block management table shown in FIG. 4 and searches for the FAT information identifier 21 that corresponds to the block identifier B identifying the block B that contains the page indicated by the physical address B6. After that, the controller controlling unit 128 further searches for a piece of FAT information of the page indicated by the physical address B6, out of the pieces of FAT information of the pages corresponding to the FAT information identifier 21. The controller controlling unit 128 then updates the piece of FAT information found in the search so as to indicate "D" (step S402 in FIG. 27).

Subsequently, the controller controlling unit 128 scans the pieces of FAT information of all the pages in the block B (i.e., all the pieces of FAT information that correspond to the FAT information identifier 21) and confirms that each of the pieces of FAT information corresponding to all the pages indicates either "D", which means "deleted", or "IV", which means "invalid" (step S404: Yes in FIG. 27).

Subsequently, because each of the pieces of FAT information corresponding to all the pages indicates either "D" or "IV", the controller controlling unit 128 deletes the FAT information identifier 21 corresponding to the block identifier B identifying the block B from the block management table shown in FIG. 4, and also updates the piece of use-state judging information corresponding to the block identifier B so as to indicate "unused" (steps S406 and S408 in FIG. 27).

After that, the controller controlling unit 128 deletes all the entries in which physical addresses indicating the pages contained in the block B are kept in correspondence with logical addresses, from the translation table shown in FIG. 2 (step S410 in FIG. 27). After that, because the deletion range has completely been processed, the controller controlling unit 128 ends the deleting process.

After that, when having finished the deleting process, the controller controlling unit 128 notifies the instruction controlling unit 22 that the deleting process has been finished. The instruction controlling unit 22 notifies the host apparatus 2 that the deleting process based on the received delete instruction has been finished (steps S110 and S112 in FIG. 5).

In this situation, the block management table obtained after the deleting process on the logical address L8 has been finished is in the state shown in FIG. 11. A schematic drawing illustrating the state of the pieces of data stored in the pages contained in the block after the deleting process on the logical address L8 has been finished is shown in FIG. 12.

Figures 28, 29:
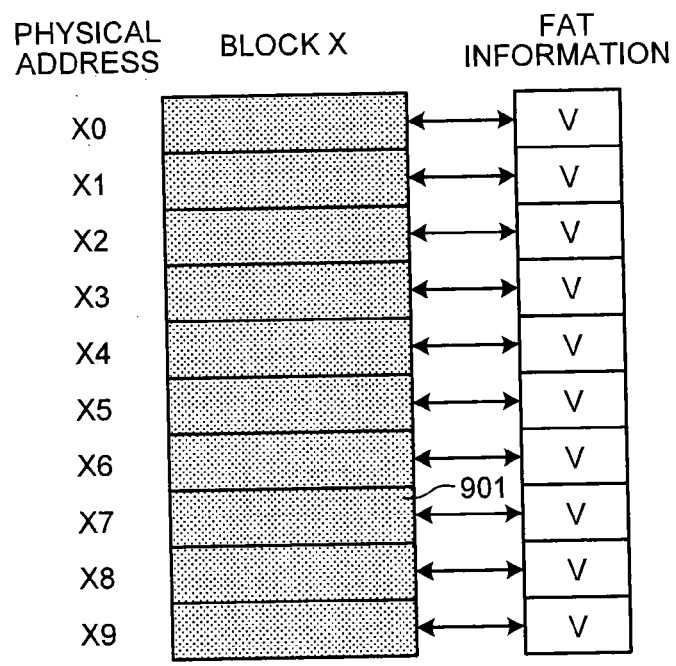
FIG. 28 is a drawing illustrating an example of the translation table obtained after a deleting process has been finished.
FIG. 29 is a drawing illustrating an example of a data managing method used in a conventional memory system.
Figure 30:
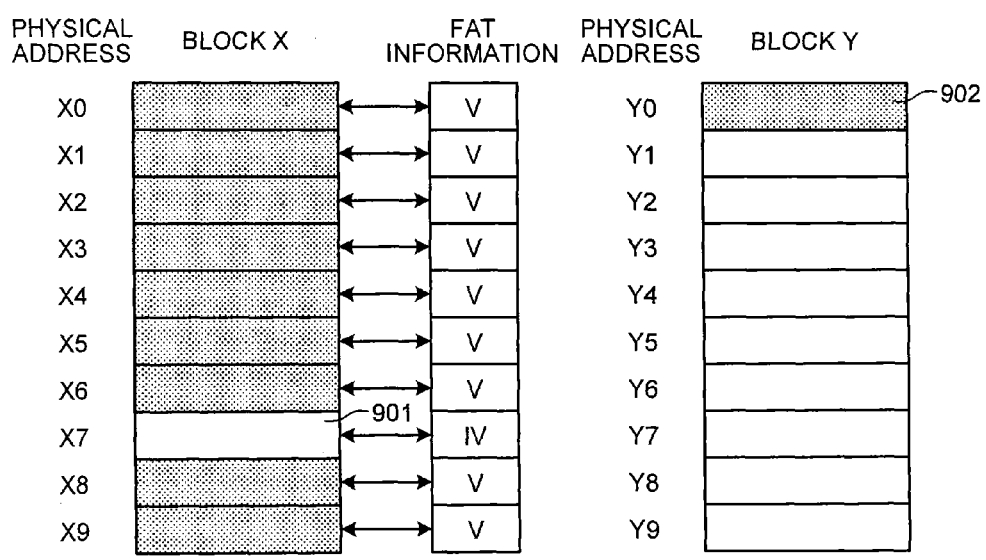
FIG. 30 is a drawing illustrating another example of the data managing method used in the conventional memory system.

FIG. 28 is a drawing illustrating a state of the translation table obtained after the deleting process on the logical address L8 has been finished. As shown in FIG. 28, in the translation table obtained after the deleting process on the logical address L8 has been finished, all entries that show the correspondence relationships between the logical addresses L0 to L2 and L5 to L8 and the physical addresses B0, B1, B2, B3, B5, B4, and B6 have been deleted.

As explained above, the pieces of FAT information are kept in correspondence with the pages contained in all the blocks being used. Thus, it is possible to simplify the updating process of the translation table compared to the first embodiment in which the translation table is updated every time a piece of FAT information is updated so as to indicate "D", which means "deleted".

In other words, even if the updating process of the translation table is simplified, it is possible to flexibly process the delete instructions in units of pages because the pieces of FAT information are kept in correspondence with the pages that are contained in all the blocks being used.

In addition, the contents of the translation table at this point in time are not greatly different from those of the first embodiment. Thus, the data amount of the translation table is appropriately reduced.

As explained above, even if the updating process of the translation table is simplified as in the second embodiment, it is possible to flexibly process the delete instructions in units of pages and to effectively utilize the storage areas in the flash memories.

The present invention is not limited only to the exemplary embodiments described above. At the implementation stage of the invention, it is possible to materialize the present invention while applying modifications to the constituent elements, without departing from the gist thereof. It is also possible to constitute various inventions by combining, as necessary, two or more of the constituent elements disclosed in the exemplary embodiments described above. For example, it is acceptable to omit one or more of the constituent elements described in the exemplary embodiments. Further, it is also acceptable to combine, as necessary, one or more constituent elements from mutually different ones of the exemplary embodiments.

In the exemplary embodiments described above, in the case where the translation table includes no physical address that corresponds to a logical address or in the case where the piece of FAT information of the page indicated by a physical address indicates other than "V", the null data is returned to the host apparatus 2 as a response to a read instruction. However, another arrangement is acceptable in which data other than the null data is returned to the host apparatus 2.

For example, an arrangement is acceptable in which the work memory 38 or the like stores therein such a physical address in the flash memories 11 from which the controller controlling unit 28 or 128 is able to read data the most quickly, so that the controller controlling unit 28 or 128 reads the data stored in the page indicated by the physical address and returns the read data to the host apparatus 2.

Alternatively, another arrangement is acceptable in which the work memory 38 or the like stores therein data that has most recently been read by the controller controlling unit 28 or 128, so that the stored data is returned to the host apparatus 2.

Furthermore, yet another arrangement is acceptable in which the controller controlling unit 28 or 128 returns a random number value that has been generated by the controller 10 or 110 to the host apparatus 2. Alternatively, the random number may be generated by the controller controlling unit 28 or 128. As another example, the controller 10 or 110 may include separate hardware for the specific purpose such as a random number generator.

In the exemplary embodiments described above, only in the case where the piece of FAT information of the page indicated by a physical address indicates "V", the data stored in the page indicated by the physical address is read and returned to the host apparatus 2. However, another arrangement is acceptable in which, even in the case where the piece of FAT information indicates "D", the data stored in the page indicated by the physical address is read and returned to the host apparatus 2.

Before the piece of FAT information is updated so as to indicate "D", the piece of FAT information indicated "v". Thus, because some data is stored in the page, it is acceptable to read the data and return the read data to the host apparatus 2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A controller comprising:
   a translation table storage unit that stores a translation table in which logical addresses and physical addresses are kept in correspondence with one another, each of the logical addresses indicating a virtual position in an area in a flash memory, and each of the physical addresses indicating a physical position in the area in the flash memory in units of pages;
   a File Allocation Table (FAT) information storage unit that stores pieces of FAT information and FAT information identifiers that are kept in correspondence with one another, each of the pieces of FAT information indicating a state of data stored in a corresponding page of pages contained in a corresponding block of a plurality of blocks which are areas corresponding to a plurality of the pages, and each of the FAT information identifiers identifying a different one of the blocks to which the corresponding pages each storing data in the state of data indicated by a corresponding one of the pieces of FAT information belong;
   a block management-table storage unit that stores a block management table in which block identifiers, pieces of use-state judging information, and the FAT information identifiers are kept in correspondence with one another, each of the block identifiers identifying a different one of the blocks, each of the pieces of use-state judging information indicating whether a corresponding one of the blocks is used or unused, and the FAT information identifiers being respectively kept in correspondence with all of such blocks that are each indicated as being used by a corresponding one of the pieces of use-state judging information; and
   a controller controlling unit that manages data stored in the flash memory by using the translation table, the pieces of FAT information, and the block management table,
   wherein each of the pieces of FAT information indicates that the data stored in the corresponding page of the pages is at least one of valid, invalid, and deleted, and
   wherein, when each of all pages contained in any one of the blocks is indicated as either deleted or invalid by the corresponding one of the pieces of FAT information, the controller controlling unit updates the block management table so that the piece of use-state judging information corresponding to the one of the blocks indicates unused, and deletes a corresponding one of the FAT information identifiers that identifies the one of the blocks.

2. The controller according to claim 1,
   wherein when the controller controlling unit has received, from a host apparatus, a delete instruction instructing a deletion of data, the controller controlling unit updates a corresponding one of the pieces of FAT information of such a page that is indicated by a physical address corresponding to a logical address indicated in the delete instruction so that the corresponding piece of FAT information indicates deleted.

3. The controller according to claim 2,
wherein the controller controlling unit further deletes, from the translation table, such a physical address that indicates the page of which the corresponding piece of FAT information has been updated so as to indicate deleted, and such a logical address that corresponds to the physical address.

4. The controller according to claim 1,
wherein when each of all pages contained in any one of the blocks is indicated as either deleted or invalid by the corresponding one of the pieces of FAT information, the controller controlling unit further deletes, from the translation table, such physical addresses that respectively indicate the pages contained in the block, and such logical addresses that respectively correspond to the physical addresses.

5. The controller according to claim 1,
wherein the controller controlling unit receives, from a host apparatus, a read instruction instructing reading of data, and when the translation table does not include such a physical address that corresponds to a logical address indicated in the read instruction or when a corresponding one of the pieces of FAT information of a page indicated by such a physical address indicates either deleted or invalid, the controller controlling unit returns, to the host apparatus, at least one of null data, data stored in a page indicated by a predetermined physical address, and a predetermined value.

6. The controller according to claim 1,
wherein the controller controlling unit receives, from a host apparatus, a read instruction instructing reading of data, and when the translation table does not include such a physical address that corresponds to a logical address indicated in the read instruction or when a corresponding one of the pieces of FAT information of a page indicated by such a physical address indicates either deleted or invalid, the controller controlling unit generates a random number and returns the generated random number to the host apparatus.

7. The controller according to claim 1,
wherein the controller controlling unit receives, from a host apparatus, a read instruction instructing reading of data, and when a corresponding one of the pieces of FAT information of a page indicated by such a physical address that corresponds to a logical address indicated in the read instruction indicates deleted, the controller controlling unit returns the data stored in the page to the host apparatus.

8. The controller according to claim 1,
wherein when the controller controlling unit has received, from a host apparatus, a write instruction instructing writing of data, the controller controlling unit refers to the block management table and writes data of which the writing is instructed in the write instruction into a page contained in one of the blocks indicated as being unused by a corresponding one of the pieces of use-state judging information, brings an unused FAT information identifier into correspondence with the one of the blocks, configures a corresponding one of the pieces of FAT information of the page so as to indicate valid, and configures the corresponding one of the pieces of use-state judging information so as to indicate used.

9. A memory system comprising:
a controller that includes:
    a translation table storage unit that stores a translation table in which logical addresses and physical addresses are kept in correspondence with one another, each of the logical addresses indicating a virtual position in an area in a flash memory, and each of the physical addresses indicating a physical position in the area in the flash memory in units of pages,
    a File Allocation Table (FAT) information storage unit that stores pieces of FAT information and FAT information identifiers that are kept in correspondence with one another, each of the pieces of FAT information indicating a state of data stored in a corresponding page of pages contained in a corresponding block of a plurality of blocks which are areas corresponding to a plurality of the pages, and each of the FAT information identifiers identifying a different one of the blocks to which the corresponding pages each storing data in the state of data indicated by a corresponding one of the pieces of FAT information belong,
    a block management-table storage unit that stores a block management table in which block identifiers, pieces of use-state judging information, and the FAT information identifiers are kept in correspondence with one another, each of the block identifiers identifying a different one of the blocks, each of the pieces of use-state judging information indicating whether a corresponding one of the blocks is used or unused, and the FAT information identifiers being respectively kept in correspondence with all of such blocks that are each indicated as being used by a corresponding one of the pieces of use-state judging information, and
    a controller controlling unit that manages data stored in the flash memory by using the translation table, the pieces of FAT information, and the block management table; and
a flash memory that stores data that is managed by the controller,
wherein each of the pieces of FAT information indicates that the data stored in the corresponding page of the pages is at least one of valid, invalid, and deleted, and
wherein, when each of all pages contained in any one of the blocks is indicated as either deleted or invalid by the corresponding one of the pieces of FAT information, the controller controlling unit updates the block management table so that the piece of use-state judging information corresponding to the one of the blocks indicates unused, and deletes a corresponding one of the FAT information identifiers that identifies the one of the blocks.

* * * * *